US007284103B2

(12) United States Patent
Kaga et al.

(10) Patent No.: US 7,284,103 B2
(45) Date of Patent: Oct. 16, 2007

(54) DATA COPY METHOD

(75) Inventors: Takashi Kaga, Odawara (JP); Kouji Arai, Odawara (JP); Haruaki Watanabe, Isehara (JP)

(73) Assignee: Hitachi, Ltd., Tokyo (JP)

( * ) Notice: Subject to any disclaimer, the term of this patent is extended or adjusted under 35 U.S.C. 154(b) by 479 days.

(21) Appl. No.: 10/300,339

(22) Filed: Nov. 20, 2002

(65) Prior Publication Data

US 2003/0101318 A1 May 29, 2003

(30) Foreign Application Priority Data

Nov. 26, 2001 (JP) ............................. 2001-358663

(51) Int. Cl.
*G06F 12/16* (2006.01)
*G06F 12/00* (2006.01)
(52) U.S. Cl. ..................................... 711/162
(58) Field of Classification Search ................ 711/112, 711/114, 161, 162, 165, 170, 173, 154; 707/202, 707/204; 714/6
See application file for complete search history.

(56) References Cited

U.S. PATENT DOCUMENTS

| 6,108,748 | A * | 8/2000 | Ofek et al. ................ 711/112 |
| 6,170,037 | B1 * | 1/2001 | Blumenau .................. 711/114 |
| 6,633,955 | B1 * | 10/2003 | Yin et al. ................... 711/114 |
| 6,654,862 | B2 * | 11/2003 | Morris ....................... 711/162 |
| 6,681,290 | B2 * | 1/2004 | Brower et al. ............. 711/114 |
| 6,950,900 | B1 * | 9/2005 | McKean et al. ............ 711/114 |
| 2002/0073082 | A1 * | 6/2002 | Duvillier et al. .............. 707/3 |
| 2003/0028737 | A1 | 2/2003 | Kaiya et al. |

FOREIGN PATENT DOCUMENTS

| JP | 62-134735 | 6/1987 |
| JP | 06-067808 A | 3/1994 |
| JP | 08-030495 A | 2/1996 |

(Continued)

OTHER PUBLICATIONS

Japanese language office action for corresponding Japanese patent application No. 2001-358663 lists the references above.

*Primary Examiner*—Matthew Kim
*Assistant Examiner*—Shane M Thomas
(74) *Attorney, Agent, or Firm*—Hogan & Hartson LLP

(57) ABSTRACT

A data copy method for a disk sub system that is equipped with a first storage apparatus including a first logic storage apparatus divided into a first region and a second region and a second storage apparatus including a second logic storage apparatus divided into a first region and a second region, the first logic storage apparatus and the second logic storage apparatus connecting to a host apparatus, wherein data on the first logic storage apparatus is copied to the second logic storage apparatus by an instruction from the host apparatus. With the data copy method, the second logic storage apparatus is designated as a copy destination for copying data of the first logic storage apparatus, the second region of the first logic storage apparatus and the second region of the second logic storage apparatus are switched with one another, and data stored in the first region and the second region within the first storage apparatus are copied to the first region and the second region within the second storage apparatus.

3 Claims, 28 Drawing Sheets

(Transition of states)

FOREIGN PATENT DOCUMENTS

| | | |
|---|---|---|
| JP | 11-212875 | 8/1999 |
| JP | 2000-132343 | 5/2000 |
| JP | 2000-242437 | 9/2000 |
| JP | 2000-242437 A | 9/2000 |
| JP | 2000-339104 | 12/2000 |
| JP | 2001-166974 A | 6/2001 |
| JP | 2001-216185 | 8/2001 |
| JP | 2001-318833 | 11/2001 |
| WO | WO97/45780 A1 | 12/1997 |

* cited by examiner

Fig. 6

(Before creation of pair)

| Logic Storage Apparatus No. | Region 1 | Region 2 |
|---|---|---|
| Logic Storage Apparatus 1 | Storage Apparatus A | Storage Apparatus A |
| Logic Storage Apparatus 2 | Storage Apparatus B | Storage Apparatus B |
| : | : | : |

(After creation of Pair)

| Logic Storage Apparatus No. | Region 1 | Region 2 |
|---|---|---|
| Logic Storage Apparatus 1 | Storage Apparatus A | Storage Apparatus B |
| Logic Storage Apparatus 2 | Storage Apparatus B | Storage Apparatus A |
| : | : | : |

601 602 603 604

(Transition of states)

(Differential Information)

(Immediately after reception of Pair Create Command)

| Pair No. (1002) | Pair State (1003) | Original Logic Storage Apparatus (1004) | Aux. Logic Storage Apparatus (1005) | Copy Pointer (1006) | Pair Pointer (1007) |
|---|---|---|---|---|---|
| 1 | Paired-but-uncopied state | Logic Storage Apparatus 1 | Logic Storage Apparatus 2 | 0 | 0 |
| : | : | : | : | : | : |

1001

Fig. 11 (Command Process)

Fig. 22 (Read Command Process 2)

Fig. 23 (Read Command Process 3)

Fig. 25

(After Creation of Pair is completed)

| Pair No. | Pair State | Original Logic Storage Apparatus | Auxiliary Logic Storage Apparatus | Copy Pointer | Pair Pointer |
|---|---|---|---|---|---|
| 1 | Paired-but-uncopied State | Logic Storage Apparatus 1 | Logic Storage Apparatus 2 | 0 | Terminal End of Logic Storage Apparatus 1 |
| ⋮ | ⋮ | ⋮ | ⋮ | ⋮ | ⋮ |

(Common Copying Process)

Fig. 29

(After Copying completed)

1001

| Pair No. (1002) | Pair State (1003) | Original Logic Storage Apparatus (1004) | Auxiliary Logic Storage Apparatus (1005) | Copy Pointer (1006) | Pair Pointer (1007) |
|---|---|---|---|---|---|
| 1 | Paired-but-uncopied State | Logic Storage Apparatus 1 | Logic Storage Apparatus 2 | Terminal End of Logic Storage Apparatus 1 | Terminal End of Logic Storage Apparatus 1 |
| : | : | : | : | : | : |

Fig. 30

(After receiving Pair Delete Command)

1001

| Pair No. (1002) | Pair State (1003) | Original Logic Storage Apparatus (1004) | Auxiliary Logic Storage Apparatus (1005) | Copy Pointer (1006) | Pair Pointer (1007) |
|---|---|---|---|---|---|
| 1 | Pair-deleting State | Logic Storage Apparatus 1 | Logic Storage Apparatus 2 | 0 | Terminal End of Logic Storage Apparatus 1 |
| : | : | : | : | : | : |

(Pair Delete Command Process)

(Pair Synchronizing Process)

DATA COPY METHOD

FIELD OF THE INVENTION

The present invention relates to a storage system consisting of a plurality of logic storage apparatuses, and more particularly to a method and system of creating pairs and copies of logic storage apparatuses within the same control apparatus.

DESCRIPTION OF RELATED ART

Pairing and copying operations of logic storage apparatuses may be performed within the same control apparatus. In this type of apparatus, data copying can be completed even though the frequency of data copying processes is reduced, in contrast to data renewal and reference processes performed upon requests from a host computer. Because of this, the access frequency of the logic storage apparatus at the destination of the copy is held to a lower level than that of the logic storage apparatus at the copying source. Conversely, it is desirable that the processing capacity of the logic storage apparatus at the source of data copying would be high. However, no prior art has indicated in regards to methods for enhancing the processing capacity of the logic storage apparatus at the data copying source.

FIG. 2 shows a state where the storage apparatus is equally split into two regions. More specifically, FIG. 2 shows a storage apparatus A 105 that is divided into a region A-1 201 and a region A-2 202, and similarly a storage B 106 that is divided into a region B-1 203 and a region B-2 204.

FIG. 3 shows a state where two logic storage apparatuses are created from four regions. A logic storage apparatus 1 301 consists of a region A-1 201 and a region A-2 204, and a logic storage apparatus 2 302 consists of a region B-1 203 and a region B-2 202.

A pair for data-copying is considered here with these two logic storage apparatuses. FIG. 4 shows a state where the logic storage apparatus 1 301 is designated as an original logic storage apparatus. The original logic storage apparatus 1 301 is accessed by the host computer 101, and data are copied from the logic storage apparatus 1 301 to the logic storage apparatus 2 302.

FIG. 5 shows a state where the operations that take place with the logic storage apparatuses in FIG. 4 are performed on the storage apparatus A 105 and storage apparatus B 106. Accesses from the host computer to the original logic storage apparatuses are distributed across the storage apparatus A 105 and the storage apparatus B 106. In general, as in the case of a storage apparatus like a hard disk, the storage apparatus is inaccessible between issuing of an access instruction and outputting of its result. If the storage apparatus and the logic storage apparatus are identical with each other, the logic storage apparatus is also inaccessible until the result is provided. However, if accesses are distributed across the storage apparatuses as in the case of FIG. 5, an access instruction to region B-2 204 can be issued during the wait time after an access instruction is issued to region A-1 201. In other words, the processing capacity of the logic storage apparatus 1 301 is enhanced.

SUMMARY OF THE INVENTION

The present invention pertains to dynamically changing the configuration of logic storage apparatuses at data copying source and data copying destination by forming a pair for making duplication, to thereby enhance the processing capability of the logic storage apparatus at the data copying source.

In accordance with an embodiment of the present invention, a disk sub system is equipped with a first logic storage apparatus divided into a region 1 and a region 2 within a storage apparatus A and a second logic storage apparatus divided into a region 1 and a region 2 within a storage apparatus B, the first logic storage apparatus and the second logic storage apparatus connecting to a host apparatus, wherein data on the first logic storage apparatus is copied to the second logic storage apparatus by an instruction from the host apparatus. In one aspect, the second logic storage apparatus is designated as a copy destination for copying data of the first logic storage apparatus, the region 2 of the first logic storage apparatus and the region 2 of the second logic storage apparatus are switched with one another, and data stored in the region 1 and the region 2 within the storage apparatus A are copied to the region 1 and the region 2 within the storage apparatus B.

In one aspect, in the present embodiment, the second logic storage apparatus is designated as a data copy destination for copying data of the first logic storage apparatus based on a first command that designates a copying source and a copying destination; the region 2 of the first logic storage apparatus and the region 2 of the second logic storage apparatus are switched with one another, and the data on the first storage apparatus is copied to the second storage apparatus based on a second command that designates to copy the data.

Other features and advantages of the invention will be apparent from the following detailed description, taken in conjunction with the accompanying drawings that illustrate, by way of example, various features of embodiments of the invention.

BRIEF DESCRIPTION OF DRAWINGS

FIG. 6 indicates the relation between a logic storage apparatus and a storage apparatus before a pair is created.

FIG. 7 indicates the relation between a logic storage apparatus and a storage apparatus after a pair is created.

FIG. 25 shows pair information after completion of a pair creation.

FIG. 29 shows pair information after completion of copying.

FIG. 30 shows pair information after a pair erase command has been received.

DESCRIPTION OF PREFERRED EMBODIMENTS

Figure 1:
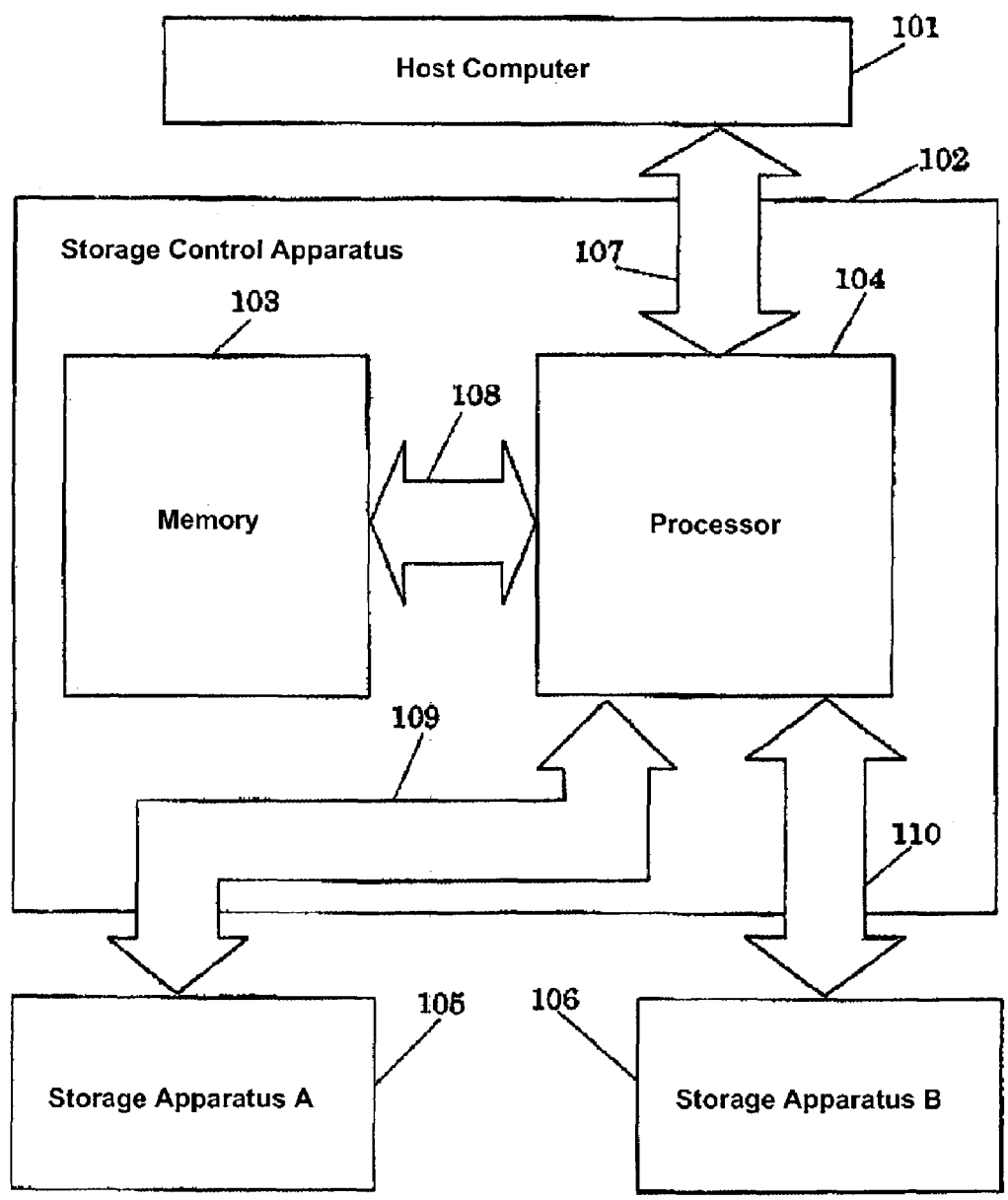
FIG. 1 shows a system structure.

FIG. 1 shows a system configuration of the present embodiment. A storage control apparatus 102 consists of a memory 103 used as a buffer to temporarily store data from a host computer 101 and data from a storage apparatus A 105 and a storage apparatus B 106, a processor 104 that controls the data transfer between the host computer 101 and the storage apparatuses A 105 and B 106, a transfer path 107 that connects the host computer 101 with the processor 104, a transfer path 108 that connects the memory 103 with the processor 104, a transfer path 109 that connects the memory apparatus A 105 with the processor 104, and a transfer path 110 that connects the memory apparatus B 106 with the processor 104. In addition to functioning as a buffer, the memory 103 records control information of the control apparatus 102.

Figure 2:
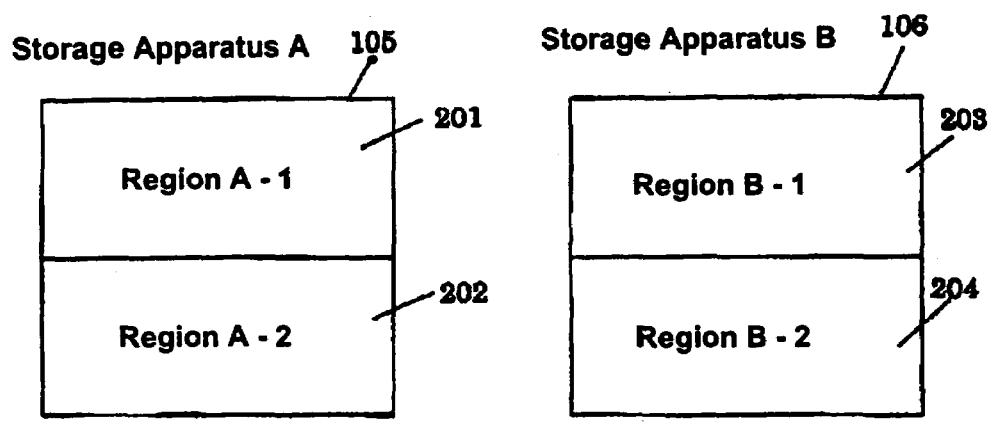
FIG. 2 shows a diagram for describing the principle of the present invention.

FIG. 2 shows a state where the storage apparatus is equally split into two regions. More specifically. FIG. 2 shows a storage apparatus A 105 that is divided into a region A-1 201 and a region A-2 202, and similarly a storage B 106 that is divided into a region B-1 203 and a region B-2 204.

Figure 3:
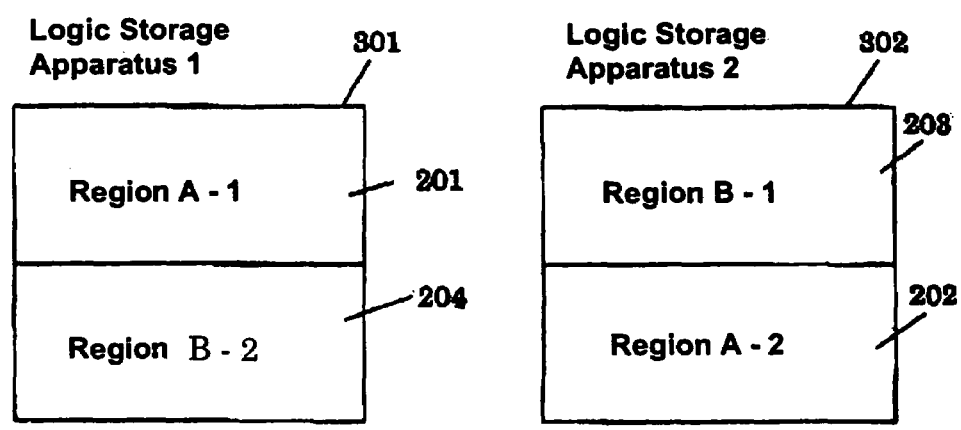
FIG. 3 shows a diagram for describing the principle of the present invention.

FIG. 3 shows a state where two logic storage apparatuses are created from four regions. A logic storage apparatus 1 301 consists of a region A-1 201 and a region B-2 204, and a logic storage apparatus 2 302 consists of a region B-1 203 and a region A-2 202.

Figure 4:
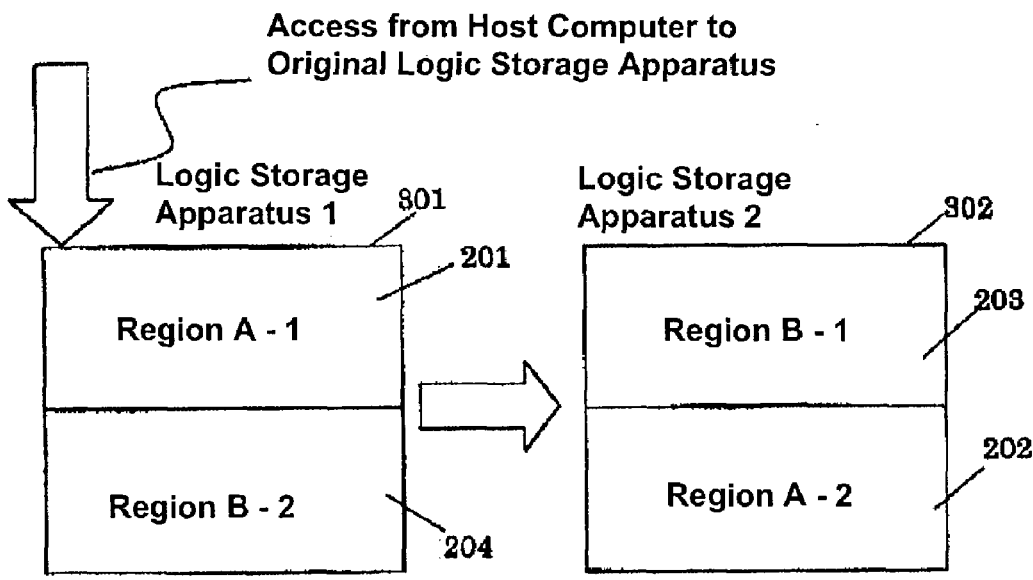
FIG. 4 shows a diagram for describing the principle of the present invention.

A pair for data-copying is considered here with these two logic storage apparatuses. FIG. 4 shows a state where the logic storage apparatus 1 301 is designated as an original logic storage apparatus. The original logic storage apparatus 1 301 is accessed by the host computer 101, and data are copied from the logic storage apparatus 1 301 to the logic storage apparatus 2 302.

Figure 5:
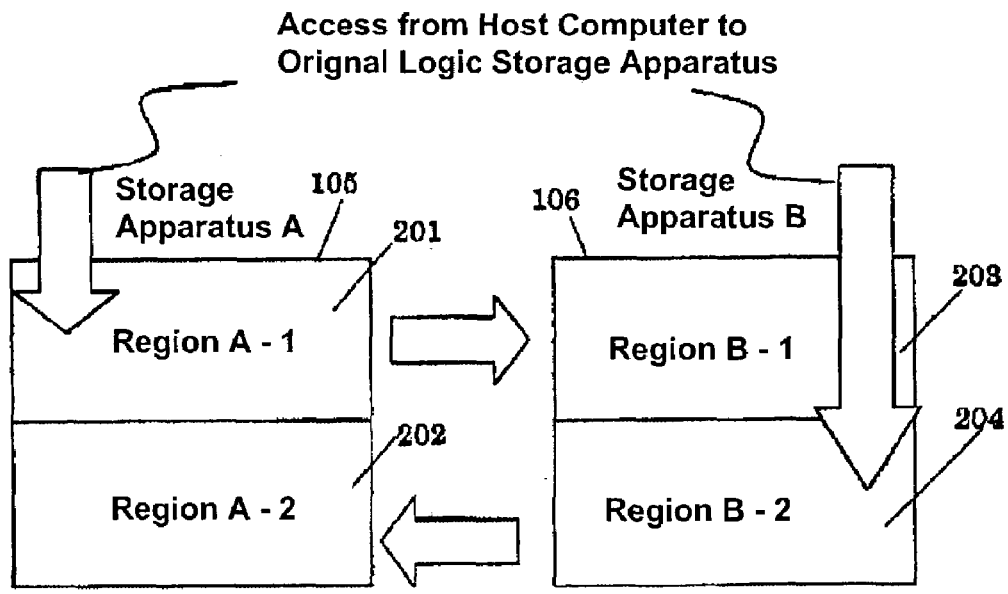
FIG. 5 shows a diagram for describing the principle of the present invention.

FIG. 5 shows a state where the operations that take place with the logic storage apparatuses in FIG. 4 are performed on the storage apparatus A 105 and storage apparatus B 106. Accesses from the host computer to the original logic storage apparatuses are distributed across the storage apparatus A 105 and the storage apparatus B 106. In general, as in the case of a storage apparatus like a hard disk, the storage apparatus is inaccessible between issuing of an access instruction and outputting of its result. If the storage apparatus and the logic storage apparatus are identical with each other, the logic storage apparatus is also inaccessible until the result is provided. However, if accesses are distributed across the storage apparatuses as in the case of FIG. 5, an access instruction to region B-2 204 can be issued during the wait time after an access instruction is issued to region A-1 201. In other words, the processing capacity of the logic storage apparatus 1 301 is enhanced.

FIG. 6 shows a table 601 indicating which of the region 1 and region 2 of the storage apparatus make up a region 1 and a region 2 of each of the logic storage apparatuses. FIG. 6 shows a state before the pair is formed. The region 1 and the region 2 of the logic storage apparatus 1 301 are both composed of the storage apparatus A 105, while the region 1 and the region 2 of the logic storage apparatus 2 302 are both composed of the storage apparatus B 106.

FIG. 7 shows the table 601 after the pair is formed. The region 1 of the logic storage apparatus 1 301 is composed of the region 1 of the storage apparatus A 105, while the region 2 thereof is composed of the region 2 of the memory apparatus B 106. The region 1 of the logic storage apparatus 2 302 is composed of the region 1 of the storage apparatus B 106, while the region 2 thereof is composed of the region 2 of the storage apparatus A 105.

Figure 8:
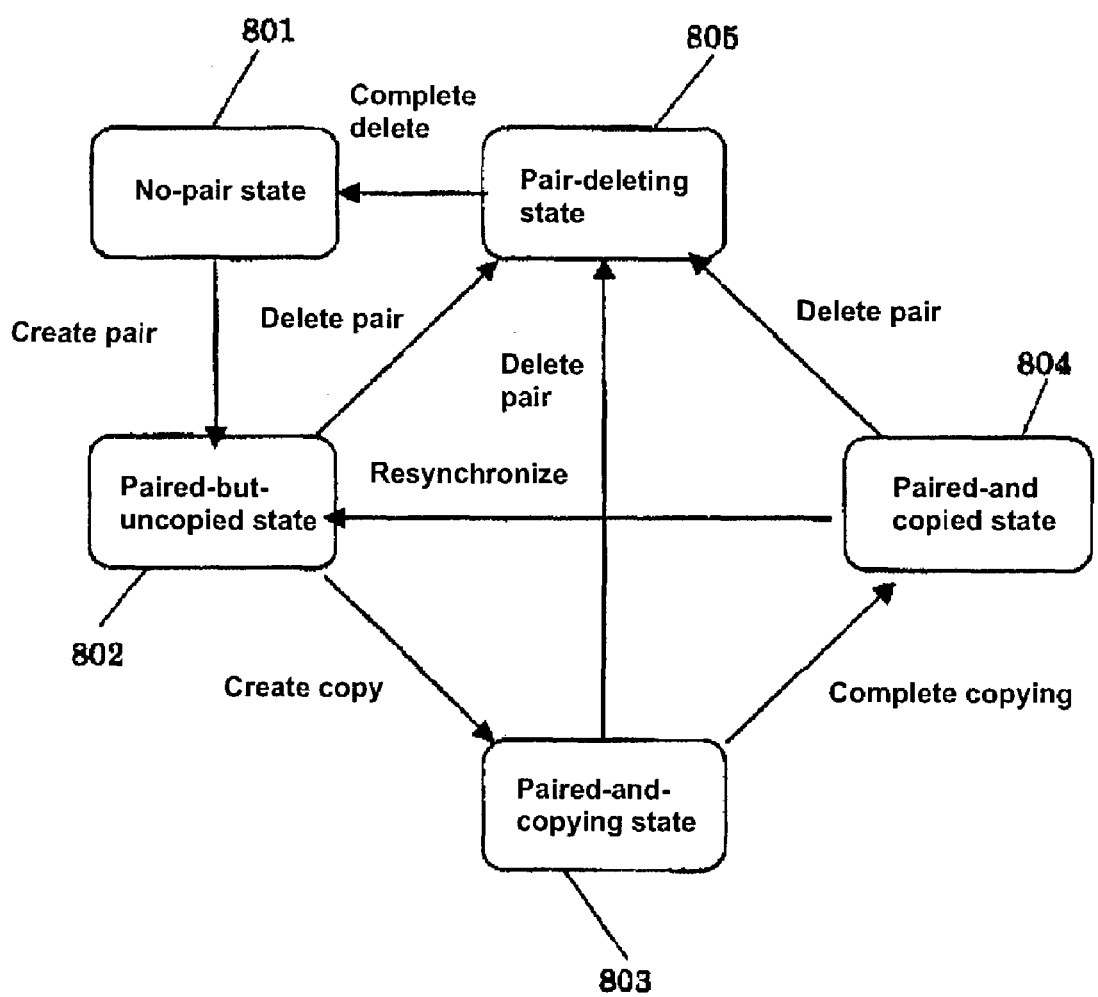
FIG. 8 shows transitions of pairing statuses.

FIG. 8 shows transition states in paring the logic storage apparatuses that becomes a copy source from which data is copied and a copy destination in which the data is copied. A no-pair state 801 is an initial state where there is no pair. In the no-pair state 801, when a request is made to create a pair, the state shifts to a paired-but-uncopied state 802 where a pair exists but there is no copy. When a pair is formed, a migration of data is necessary, as in the case of the table 601 of FIG. 7, because the storage apparatus for the region 2 that composes the logic storage apparatus in the pair is switched. In the paired-but-uncopied state 802, a pre-copying operation is performed to reduced the volume of copied at the time of data migration and copying.

When there is a request to create a copy issued in the paired-but-uncopied state 802, the state shifts to a paired-and-copying state 803 where there is a pair and a copy operation is underway. This is a state where the data at the point the request to create a copy was received is being copied from the original logic storage apparatus to an auxiliary logic storage apparatus.

When the copying is completed for the paired-and-copying state 803, the state shifts to a paired-and-copied state 804 where a pair exists and a copy also exists.

When there is a resynchronize request issued during the paired-and-copied state 804, the state shifts to the paired-but-uncopied state 802. In order to reduce the volume of copies when a copy is created, a pre-copy operation is performed for the portion in the original logic storage apparatus that is altered during the paired-and-copied state 804.

Figures 9, 10:
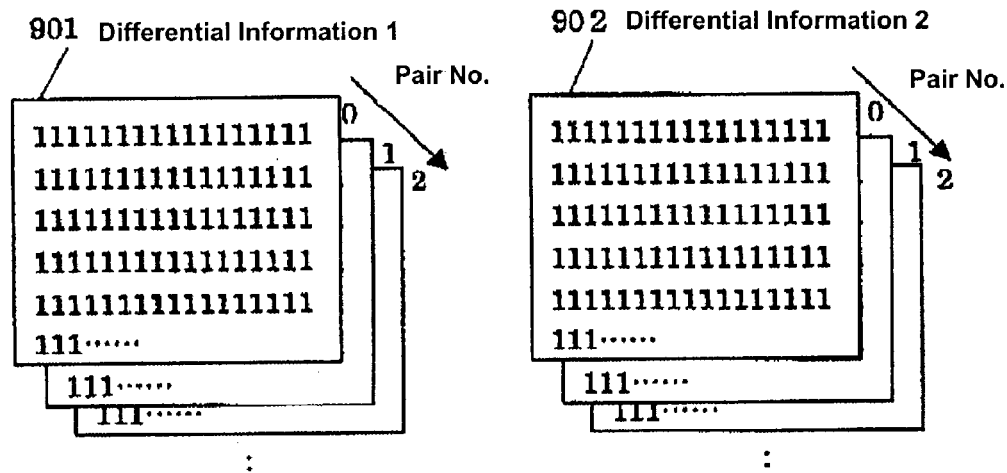
FIG. 9 shows differential information.
FIG. 10 shows pair information immediately after a pair create command.

Details concerning control information are described next. FIG. 9 shows differential information 1 901 and differential information 2 902. The differential information 1 901 exists in each pair and consists of 1-bit per each unit volume copied from the original logic storage apparatus to the auxiliary storage apparatus. When there is a renewal of data to the original logic storage apparatus, a bit corresponding to the renewal position is turned on. The differential information 2 902 is a copy of the differential information 1 901 when the state of pairing shifts to the paired-and-copying state 803. When a copying operation to copy data from the original logic storage apparatus to the auxiliary logic storage apparatus is performed, only the portion corresponding to bits that are turned on among the differential information 2 902 is copied from the original logic storage apparatus to the auxiliary logic storage apparatus.

FIG. 10 shows a table 1001 which controls the pairing state when pairs are formed. The table 1001 indicates pair numbers 1002, pair status 1003, original logic storage apparatuses 1004 that are copy source, auxiliary logic storage apparatuses 1005 that are copy destination, copy pointers 1006 that indicate how far the copying has been completed, and pair pointers 1007 which indicate how far the pairing operation has been completed.

Next, the state of how commands received from the host computer 101 are processed by the storage control apparatus 102 is explained.

Figure 11:
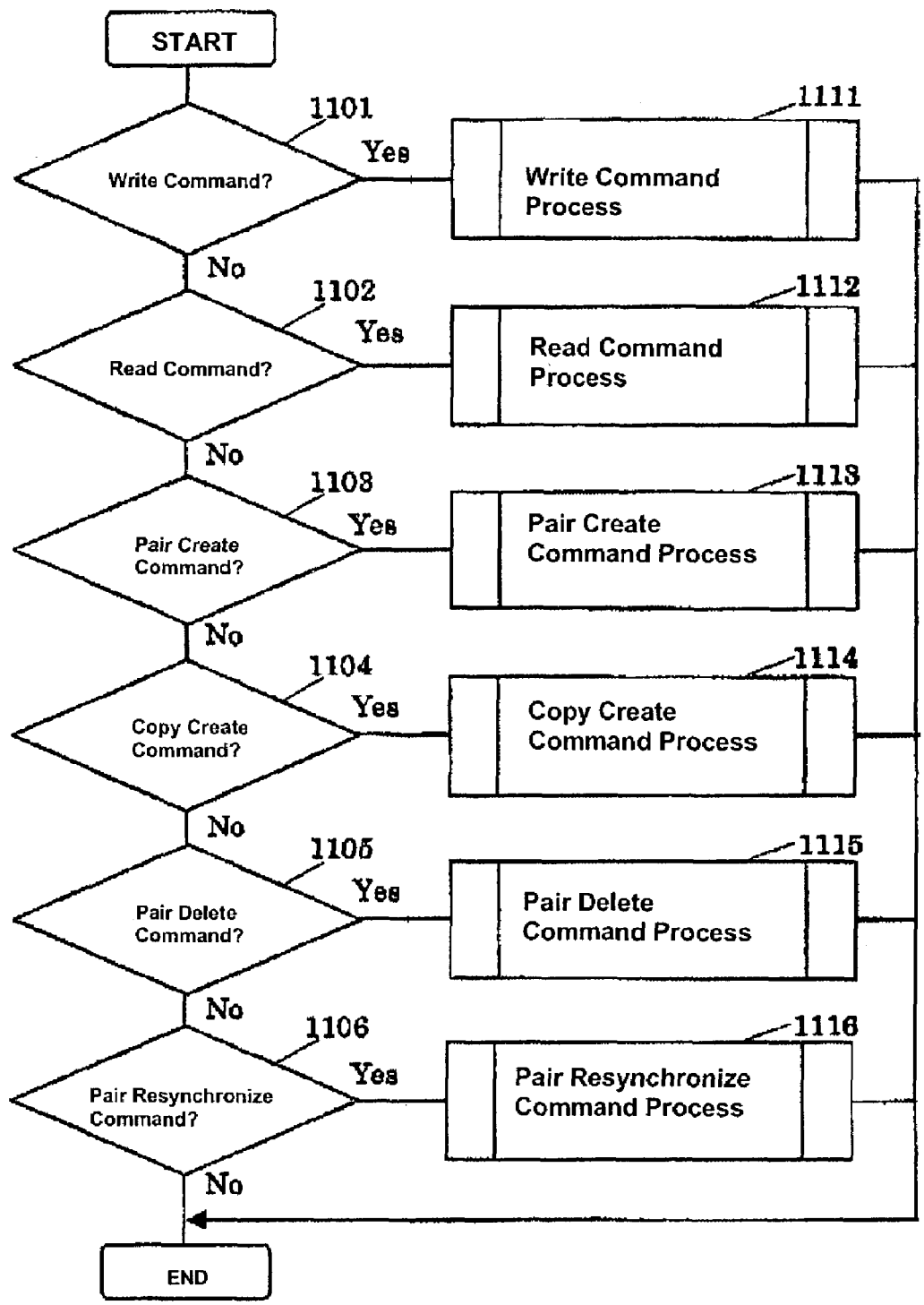
FIG. 11 shows a flowchart of a command process.

FIG. 11 shows a flowchart of a command processing process. A determination is made in Step 1101 as to whether a command is a write command. If it is a write command, a write command process is performed in Step 1111. If it is not a write command, a determination is made in Step 1102 as to whether the command is a read command. If yes, a read command process is performed in Step 1112. If it is not a read command, a determination is made in Step 1103 as to whether the command is a pair create command to create a pair. If yes, the pair create command process is performed in Step 1113. If it is not a pair create command, a determination is made in Step 1104 as to whether the command is a copy create command to create a copy. If yes, the copy create command process is performed in Step 1114. If it is not a copy create command, a determination is made in Step 1105 as to whether the command is a pair delete command. If yes, a pair delete command process is performed in Step 1115. If no, a determination is made in Step 1106 as to whether the command is a pair resynchronize command. If so, a pair resynchronize command process is performed in Step 1116.

Figure 12:
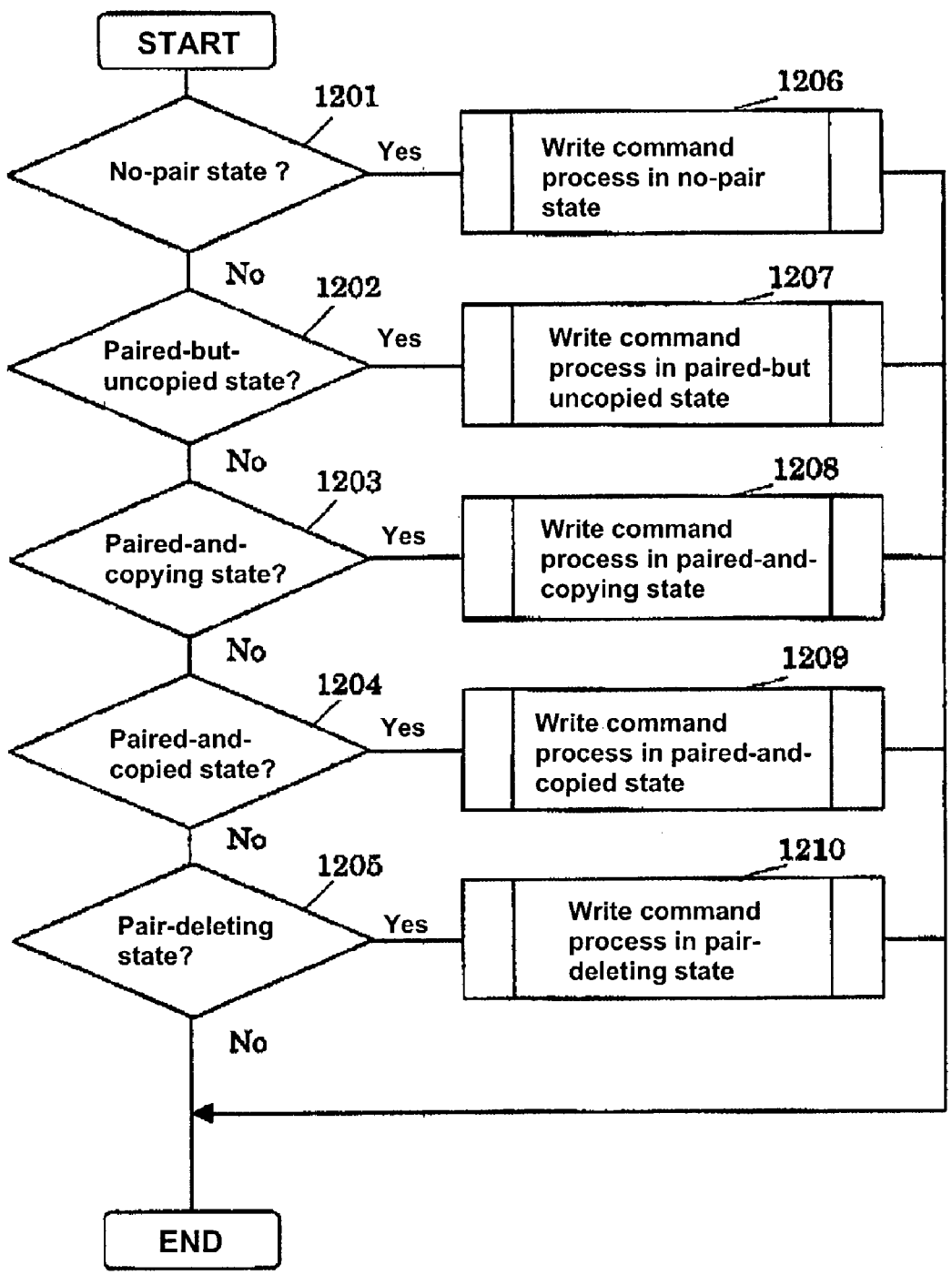
FIG. 12 shows a flowchart of a write command process.

FIG. 12 shows a flowchart of the write command process. In Step 1201, the column of original logic storage apparatuses 1004 in the table 1001 is examined to determine whether there is a pair. If there is no pair, a write command process in the no-pair state is performed in Step 1206. The pair number obtained in Step 1201 shall also be used in write command processes described below. In Step 1202, a determination is made as to whether the pair status is a paired-but-uncopied state 802. If yes in Step 1202, a write command process in the paired-but-uncopied state is performed in Step 1207. If no, a determination is made in Step 1203 whether the pair status is a paired-and-copying state 803. If yes, a write command process in the paired-and-copying state is performed in Step 1208. If no, a determination is made in Step 1204 whether the pair status is a paired-and-copied state 804. If yes, in Step 1209, a command process in the paired-and-copied state is performed. If no in Step 1204, a determination is made in Step 1205 whether the pair status is a pair-deleting state 805 where the pair is in the process of being deleted. If yes, Step 1210 is taken to perform a write command in the pair-deleting state.

Figure 13:
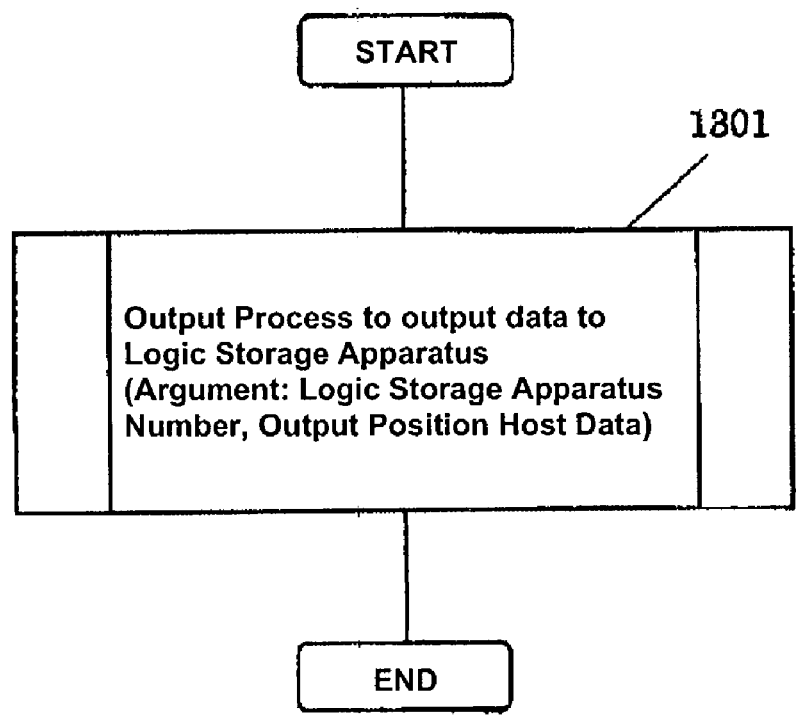
FIG. 13 shows a flowchart of a write command process in a no-pair state.

FIG. 13 indicates a flowchart of the write command process in the no-pair state. An output process is performed in Step 1301 to transfer data to the logic storage apparatus. At this time, the logic storage apparatus number, output destination position and the data received from the host computer 101 are delivered to an output destination routine of the logic storage apparatus.

Figure 14:
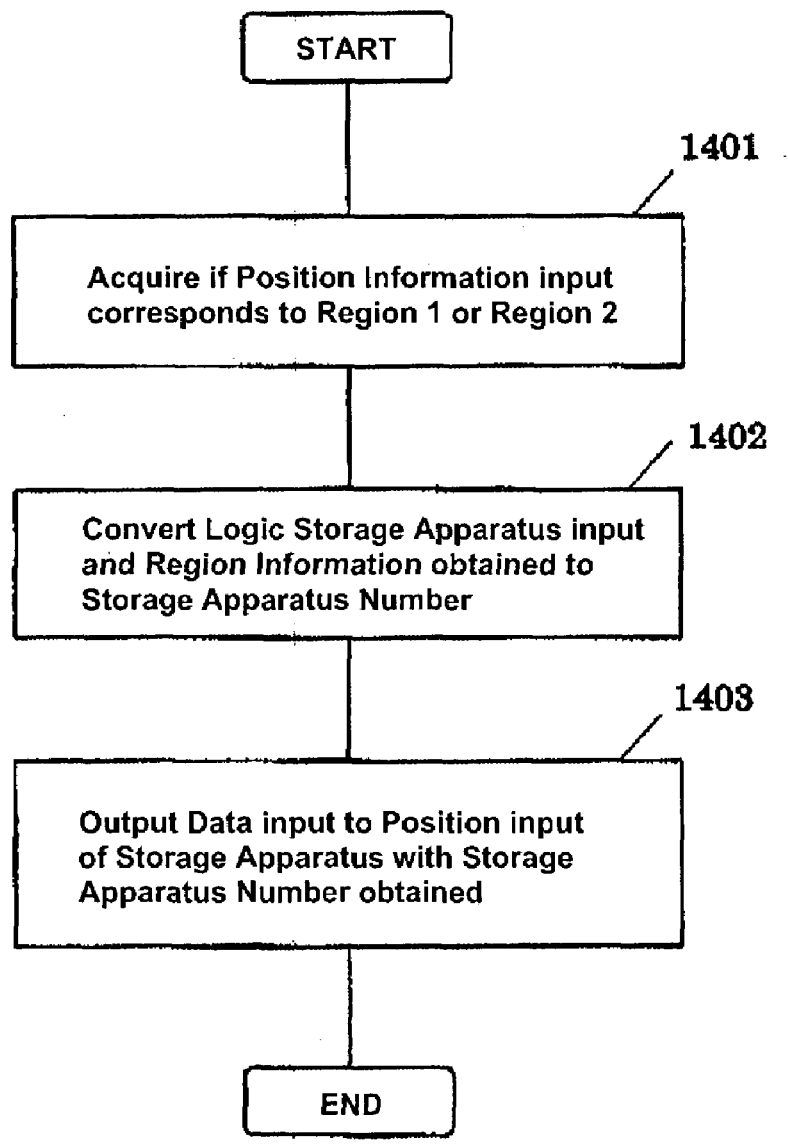
FIG. 14 shows a flowchart of an output process to output data to a logic storage apparatus.

FIG. 14 indicates a flowchart of the output process to output data to the logic storage apparatus. The input information include a logic storage apparatus number, output position and output data. In Step 1401, an acquisition is made as to whether the input position information is either the region 1 or the region 2. Step 1402 refers to the table 1001, and the kind of the acquired region and the logic storage apparatus number that is input are converted to a storage apparatus number. In Step 1403, the input data is sent to the input position in the storage apparatus of the storage apparatus number obtained in Step 1402.

The write command process in the no-pair state can be realized by the processes indicated in FIGS. 13 and 14.

Figure 15:
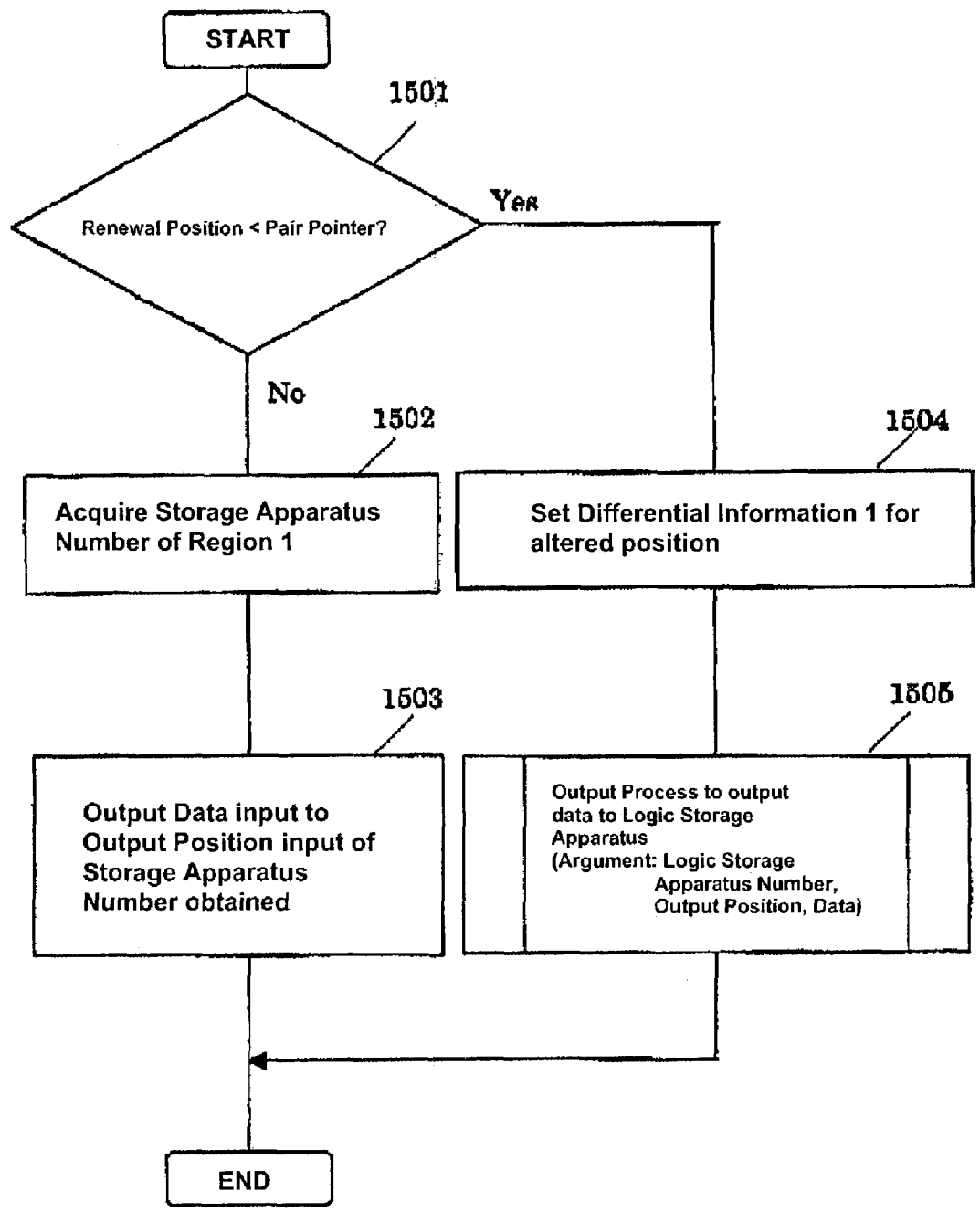
FIG. 15 shows a flowchart of write command process in a paired-but-uncopied state.

FIG. 15 shows a flowchart of the write command process in the paired-but-uncopied state that is performed when a pair exists but there is no copy. In Step 1501, the renewal position and the pair pointer 1007 are compared. When the renewal position has the same value as or a value larger than the pair pointer 1007, the process proceeds to Step 1502. If the renewal position has a value smaller that that of the pair pointer 1007, the process proceeds to Step 1504. Proceeding to Step 1502 means that the renewal position is not a position where the switching of the region 2 of the original logic storage apparatus and the region 2 of the auxiliary logic storage apparatus has not been completed in the paired-but-uncopied state 802. In Step 1502, the storage apparatus number of the region 1 of the original logic storage apparatus is acquired. In Step 1503, the input data is output to the output position that has been input at the acquired storage apparatus number. That is, the input data is output to the storage apparatus to which the region 1 of the original logic storage apparatus belongs. Proceeding from Step 1501 to Step 1504 indicates that the renewal position is a position where the switching of the region 2 of the original logic storage apparatus with the region 2 of the auxiliary logic storage apparatus has been completed in the paired-but-uncopied state 802. In Step 1504, bits of the differential information 1901 that correspond to the renewal position are turned on. In Step 1505, the output process is performed to output data to the logic storage apparatus. At this time, a logic storage apparatus number, output destination position and input data are delivered to the output destination routine of the logic storage apparatus.

The write command process in the paired-but-uncopied state is realized by the processes indicated in FIGS. 14 and 15.

Figure 16:
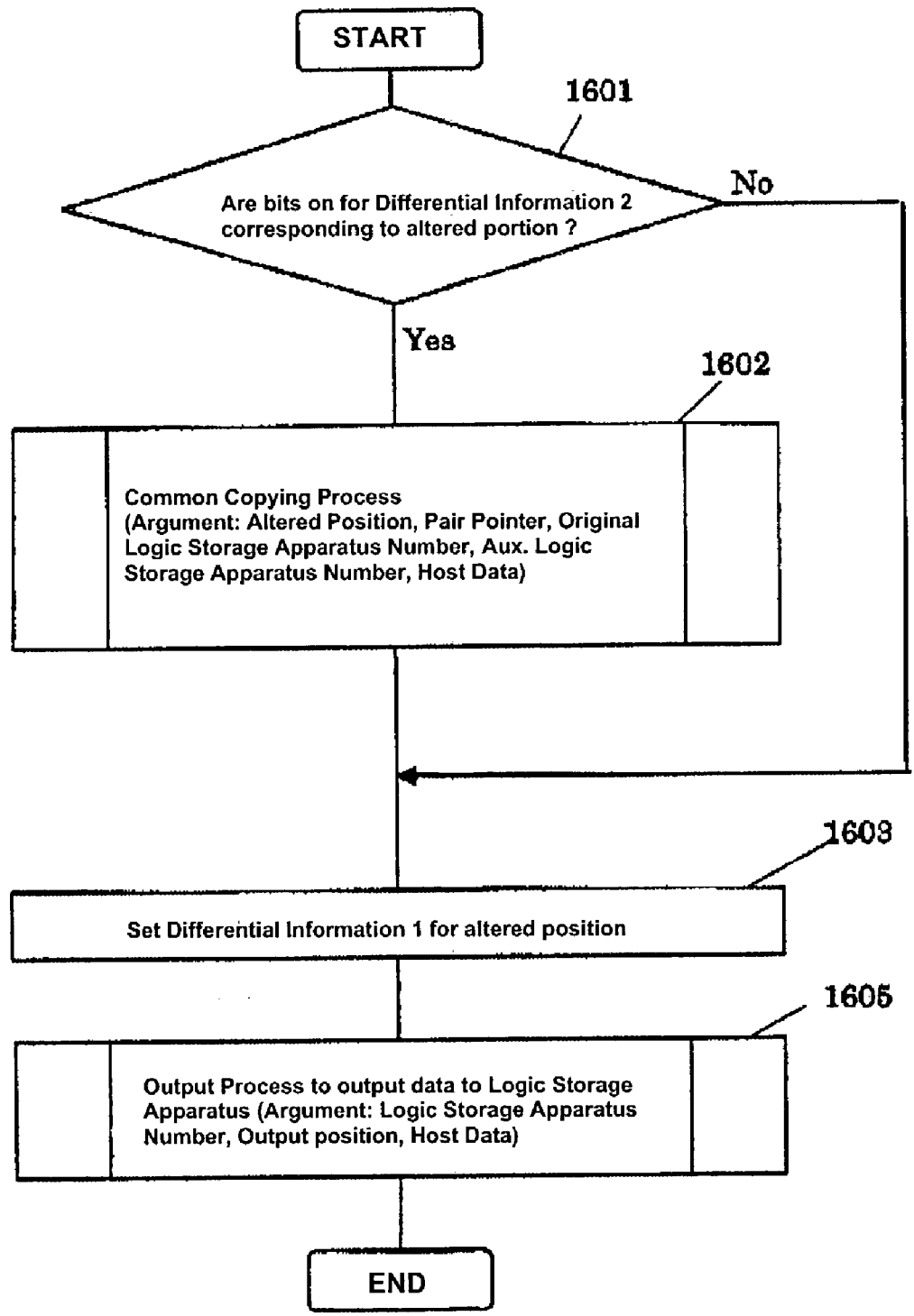
FIG. 16 shows a flowchart of a write command process in a paired-and-copying state.

FIG. 16 shows a flowchart of the write command process in the paired-and-copying state. When it is determined in Step 1601 that bits of the differential information 2 902 that correspond to the altered portion are not turned on, the process skips Step 1602 and goes to Step 1603. In Step 1602, a common copying process is performed. The renewal position, pair pointer 1007, original logic storage apparatus number, auxiliary logic storage apparatus number and host data that has been input are delivered to the common copy routine. In Step 1603, bits for of differential information 1 901 that correspond to the renewal position are turned on. In Step 1605, an output process is performed to output data to the logic storage apparatus. At this point, the logic storage apparatus number, output position and the host data that has been input are delivered to the output process routine of the logic storage apparatus.

Figure 28:
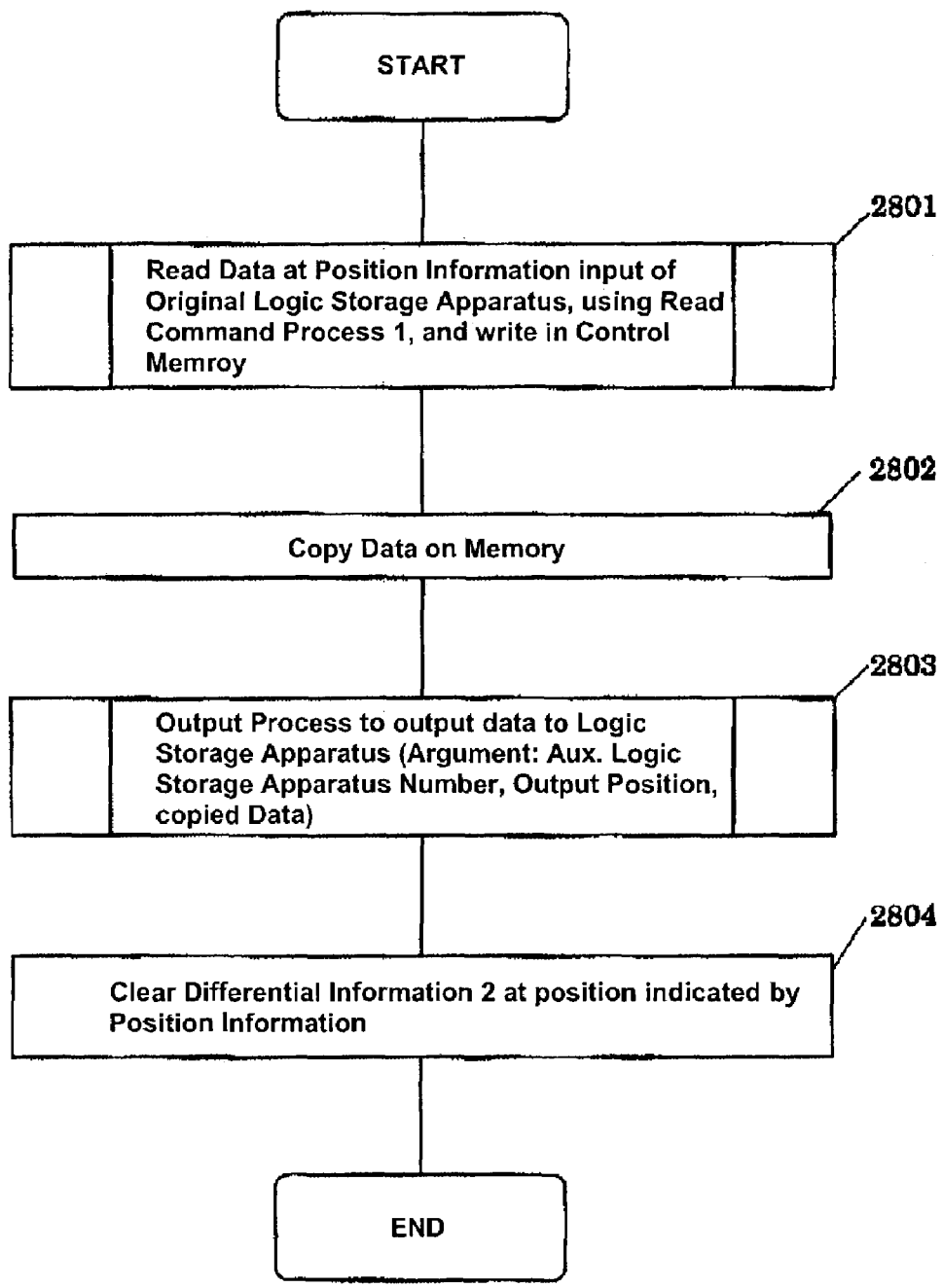
FIG. 28 shows a flowchart of a common copy process.

FIG. 28 shows a flowchart of the common copying process. A read command process 1 is performed in Step 2801. At this time, the logic storage apparatus number of the original logic storage apparatus and a position that one wishes to read are delivered to a read command process 1 routine. This enables reading the data of the original logic storage apparatus. In Step 2802, a copy of the data read is created on the memory 103 for the auxiliary logic apparatus. In Step 2803, an output process is performed to output data to the logic storage apparatus. At this time, an auxiliary logic storage apparatus number, output destination position and copied data are delivered to an output destination routine for the logic storage apparatus. In Step 2804, bits of the differential information 2 902 that correspond to the input position information are turned off.

Figure 20:
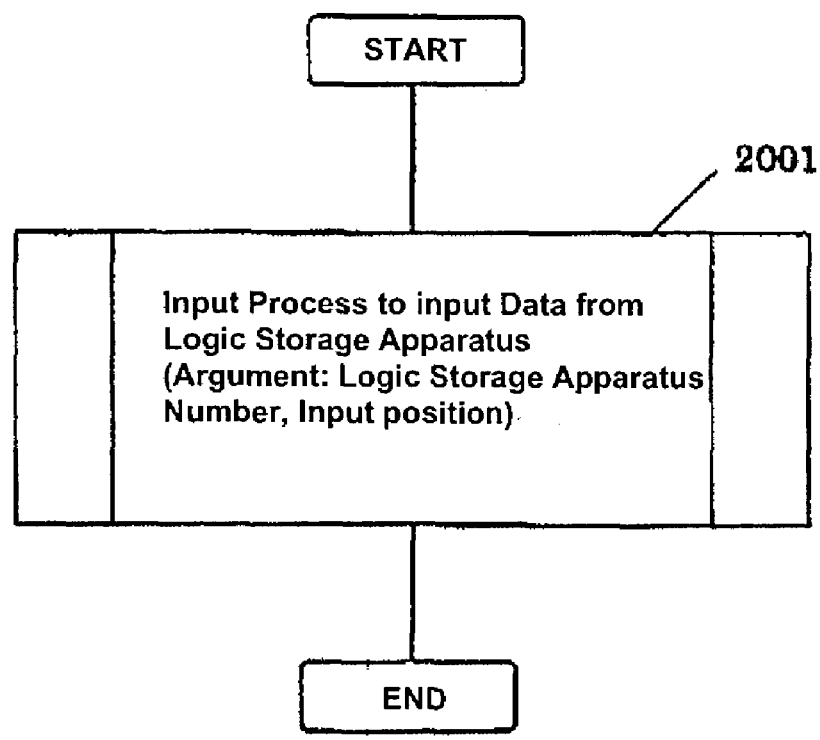
FIG. 20 shows a flowchart of a first read command process.

FIG. 20 shows a flowchart of the read command process 1. In Step 2001, an input process to input data from the logic storage apparatus is performed. At this juncture, a logic storage apparatus number and input position are delivered to an input routine from the logic storage apparatus.

Figure 21:
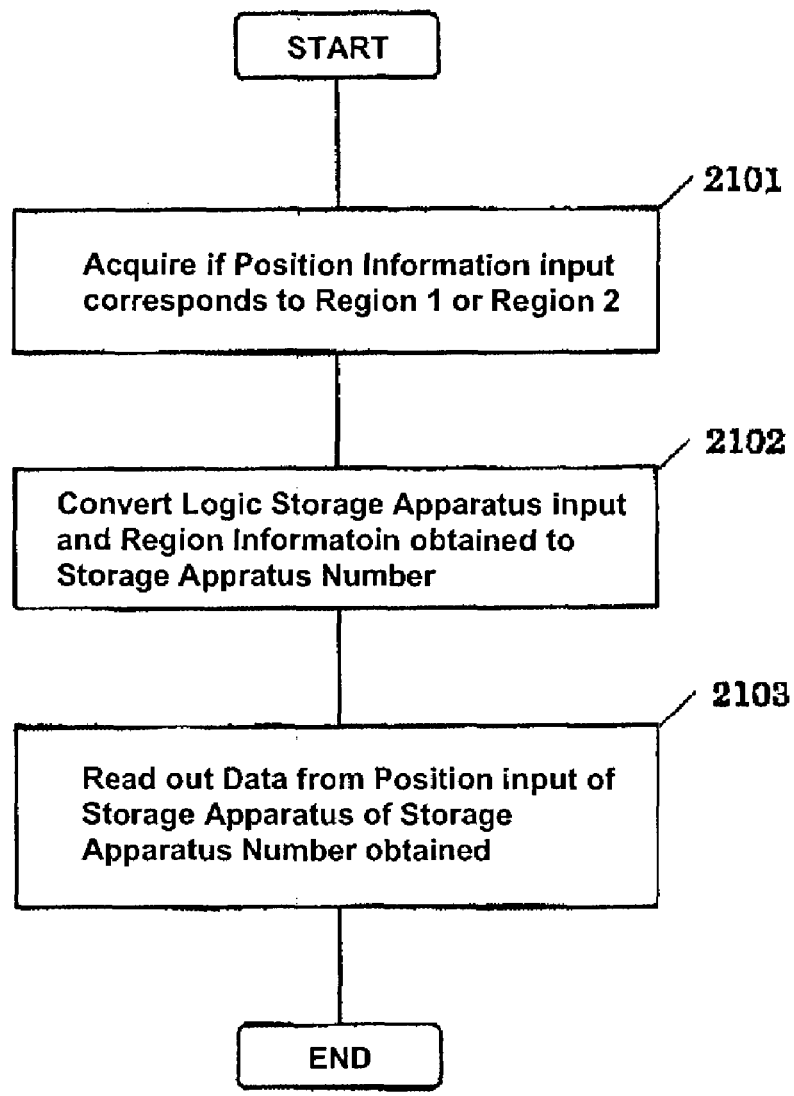
FIG. 21 shows a flowchart of an input process from a logic storage apparatus.

FIG. 21 shows a flowchart of an input process to input data from the logic storage apparatus. In Step 2101, whether the position information input corresponds to the region 1 or the region 2 is acquired. In Step 2102, by referring to the table 601, the input logic storage apparatus number and the acquired region information are converted to a storage apparatus number. Data is read, in Step 2103, from the input position of the storage apparatus defined by the storage apparatus number acquired.

The write command process in the paired-and-copying state where there is a pair and the copying process is underway can be realized through the processes indicated in FIGS. 16, 20, 21 and 28.

The common copying process can be realized by the processes indicated in FIGS. 20, 21 and 28.

The read command process 1 can be realized by the processes indicated in FIGS. 20 and 21.

Figure 17:
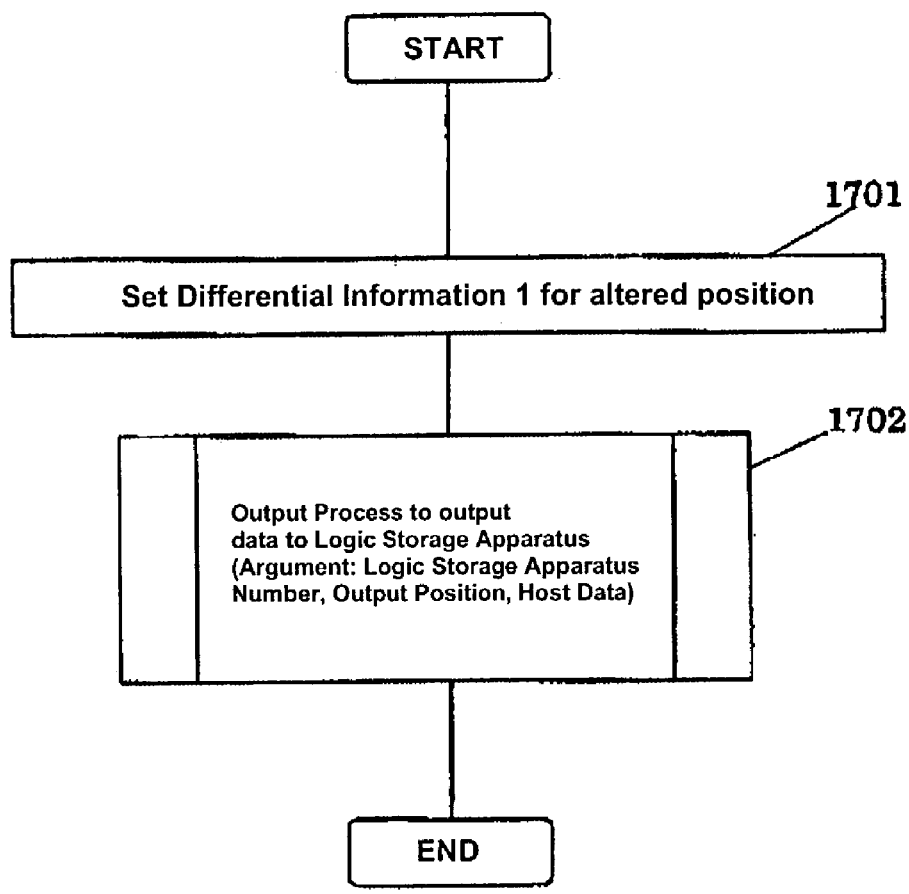
FIG. 17 shows a flowchart of a write command process in a paired-and-copied state.

FIG. 17 shows a flowchart of the write command process in the paired-and-copied state where a pair exists as well as a copy. In Step 1701, bits of differential information 1 corresponding to the renewal position are turned on. In Step 1702, an output process to output data to the logic storage apparatus is performed. A logic storage apparatus number, output position and input host data are delivered to an output routine for the logic storage apparatus process.

The write command process in the paired-and-copied state is realized through the processes indicated in FIGS. 14 and 17.

Figure 18:
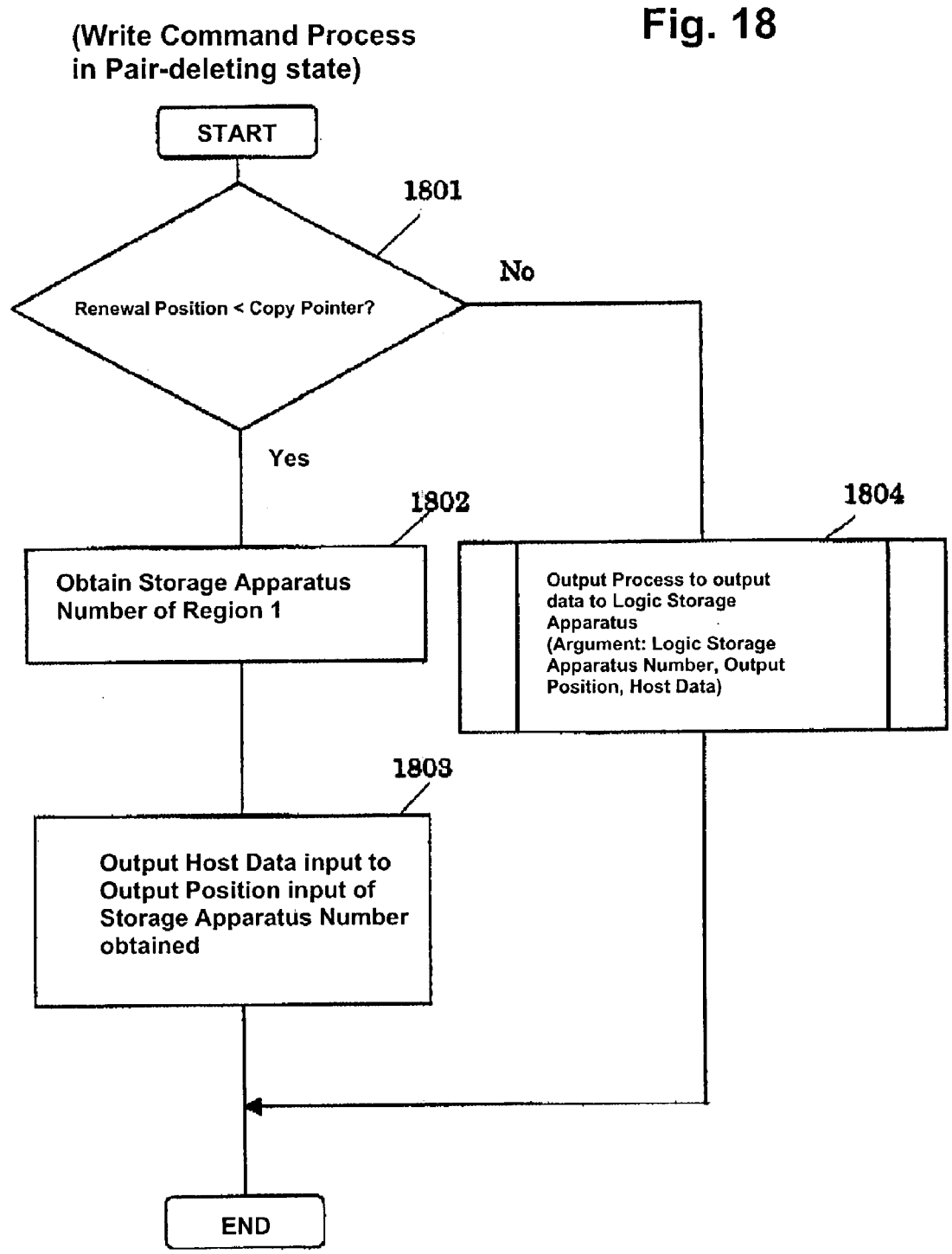
FIG. 18 shows a flowchart of a write command process in a pair-erasing state.

FIG. 18 shows a flowchart of the write command process in the pair-deleting state. In Step 1801, the renewal position and the copy pointer 1006 are compared. If the renewal position has a value smaller than that of the copy pointer 1006, the process proceeds to Step 1802. If the renewal position has a value that is the same as or larger than that of the copy pointer 1006, the process proceeds to Step 1804. Proceeding to Step 1802 means that the renewal position is a position where the switching of the region 2 of the original logic storage apparatus and the region 2 of the auxiliary logic storage apparatus has not been completed in the pair-deleting state 805. In Step 1802, the storage apparatus number of the original logic storage apparatus is acquired. In Step 1803, the input data is output to the output position that has been input for the storage apparatus number. In other words, the input data is output to the storage apparatus to which the region 1 of the original logic storage apparatus belongs. Proceeding from Step 1801 to Step 1804 means that the renewal position is a position where the switching of the respective regions 2 of the original logic storage apparatus and the auxiliary logic storage apparatus has been completed in the pair-deleting state 805. An output process to output data to the logic storage apparatus is performed in Step 1804. At this juncture, the logic storage apparatus number, output position and input host data are delivered to an output routine of the logic storage apparatus.

The write command process in the pair-deleting state can be realized by the processes indicated through FIGS. 14 and 18.

Figure 19:
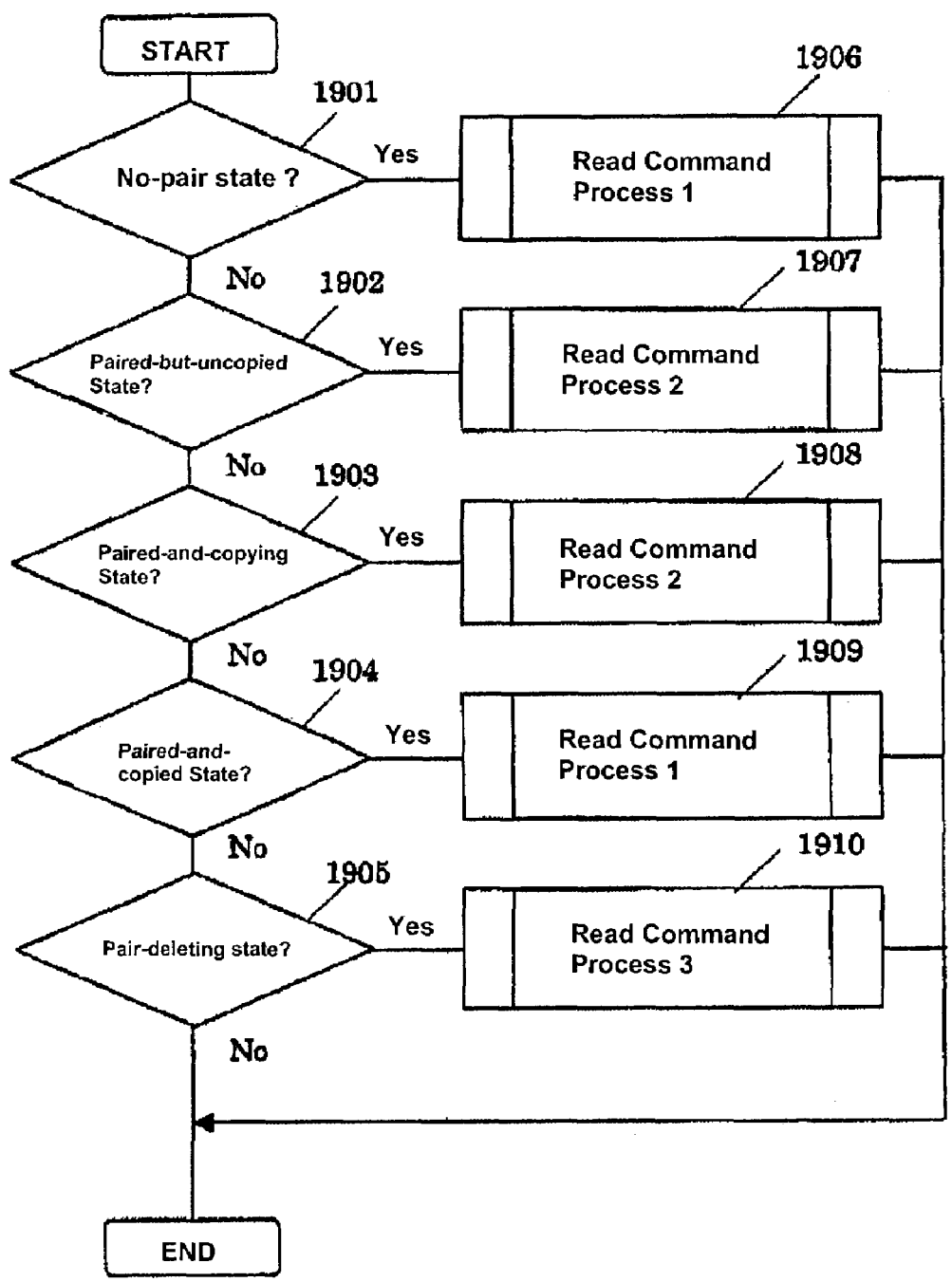
FIG. 19 shows a flowchart of a read command process.

Next, FIG. 19 shows a flowchart of the read command processes. In Step 1901, the column for the original logic storage apparatuses 1004 in the table 1001 is examined to determine whether or not there is a pair. If not, a read command process 1 is performed in Step 1906. The pair status obtained in Step 1901 is also used in read command processes described below. In Step 1902, a determination is made as to whether the pair status is the paired-but-uncopied state 802 where a pair exists but there is no copy. If it is the paired-but-uncopied state 802, a read command process 2 is performed in Step 1907. In Step 1903, a determination is made as to whether the pair status is a paired-and-copying state 803, the read command process 2 is performed in Step 1908. In Step 1904, a determination is made as to whether the pair state is the paired-and-copied state 804. If it is the paired-and-copied state 804, the read command process 1 is performed in Step 1909. In Step 1905, a determination is made as to whether the pair state is the pair-deleting state 805. If it is the pair-deleting state 805, a read command process 3 is performed in Step 1910.

As described above, the read command process 1 can be realized by the processed indicated in FIGS. 20, and 21.

Figure 22:
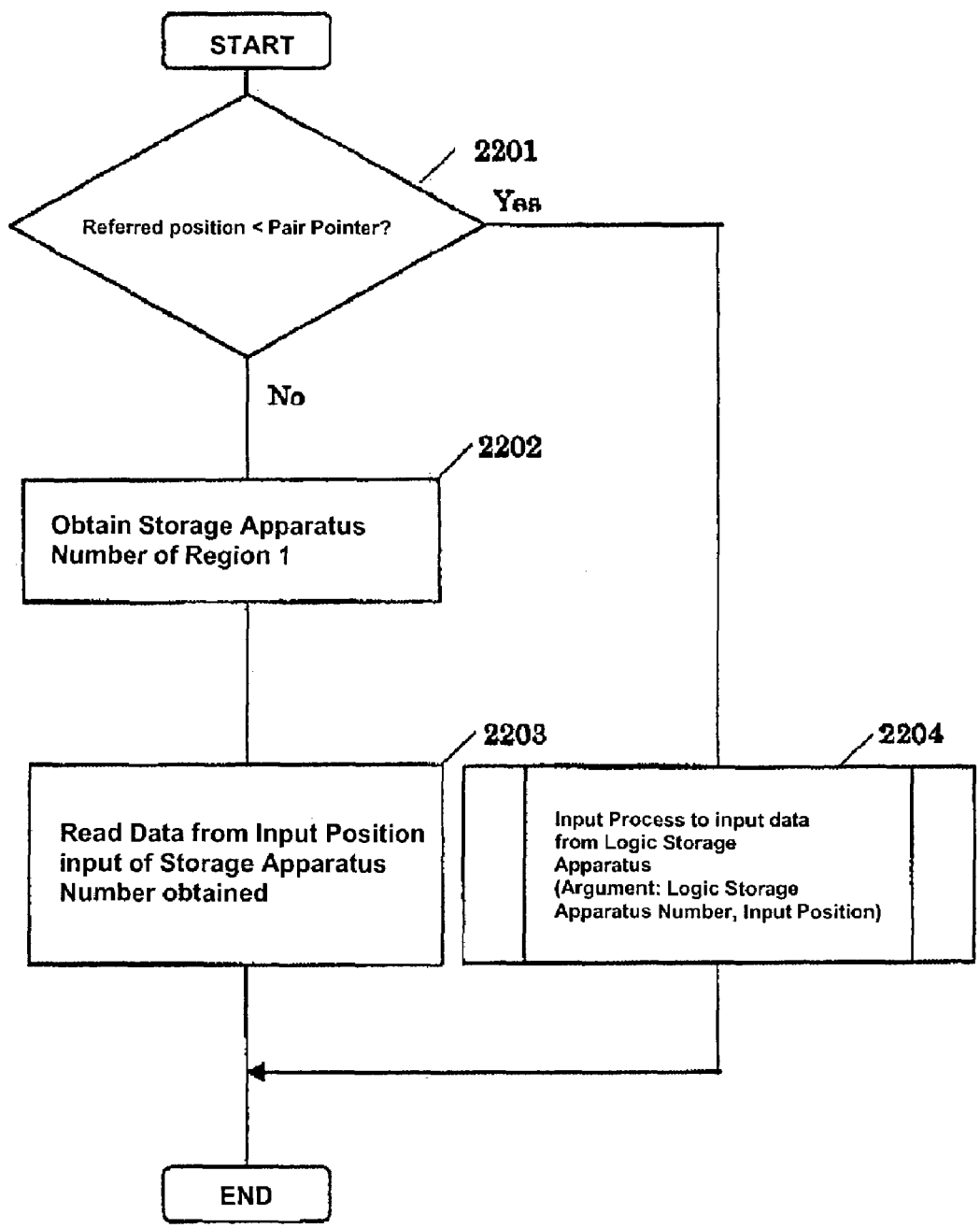
FIG. 22 shows a flowchart of a second read command process.

FIG. 22 shows a flowchart of the read command process 2. In Step 2201, a comparison is made between the reference position and the pair pointer 1007. If the reference position has a value that is the same as or larger than the value of pair pointer 1007, the process proceeds to Step 2202. If the reference position value is smaller than that of the pair pointer 1007, the process proceeds to Step 2204. Proceeding to Step 2202 means that the reference position is at a position where the region 2 of the original logic storage apparatus has not been switched with the region 2 of the auxiliary logic storage apparatus in the paired-but-uncopied state 802 or in the paired-and-copying state 803. In Step 2202, the storage apparatus number of the region 1 of the original logic storage apparatus is acquired. In Step 2203, data is read from the input position that has been input for the storage apparatus number obtained. In other words, the data is read from the storage apparatus to which the region 1 of the original logic storage apparatus belongs. Proceeding from Step 2201 to Step 2204 means that the reference position is a position where the switching of the respective regions 2 of the original logic storage apparatus and the auxiliary logic storage apparatus has been completed in the paired-but-uncopied state 802 or in the paired-and-copying state 803. The input process to input data from the logic storage apparatus is performed in Step 2204. At this juncture, the logic storage apparatus number and the input are delivered to an input routine of the logic storage apparatus.

The read command process 2 is realized by the processed indicated through FIGS. 21 and 22.

Figure 23:
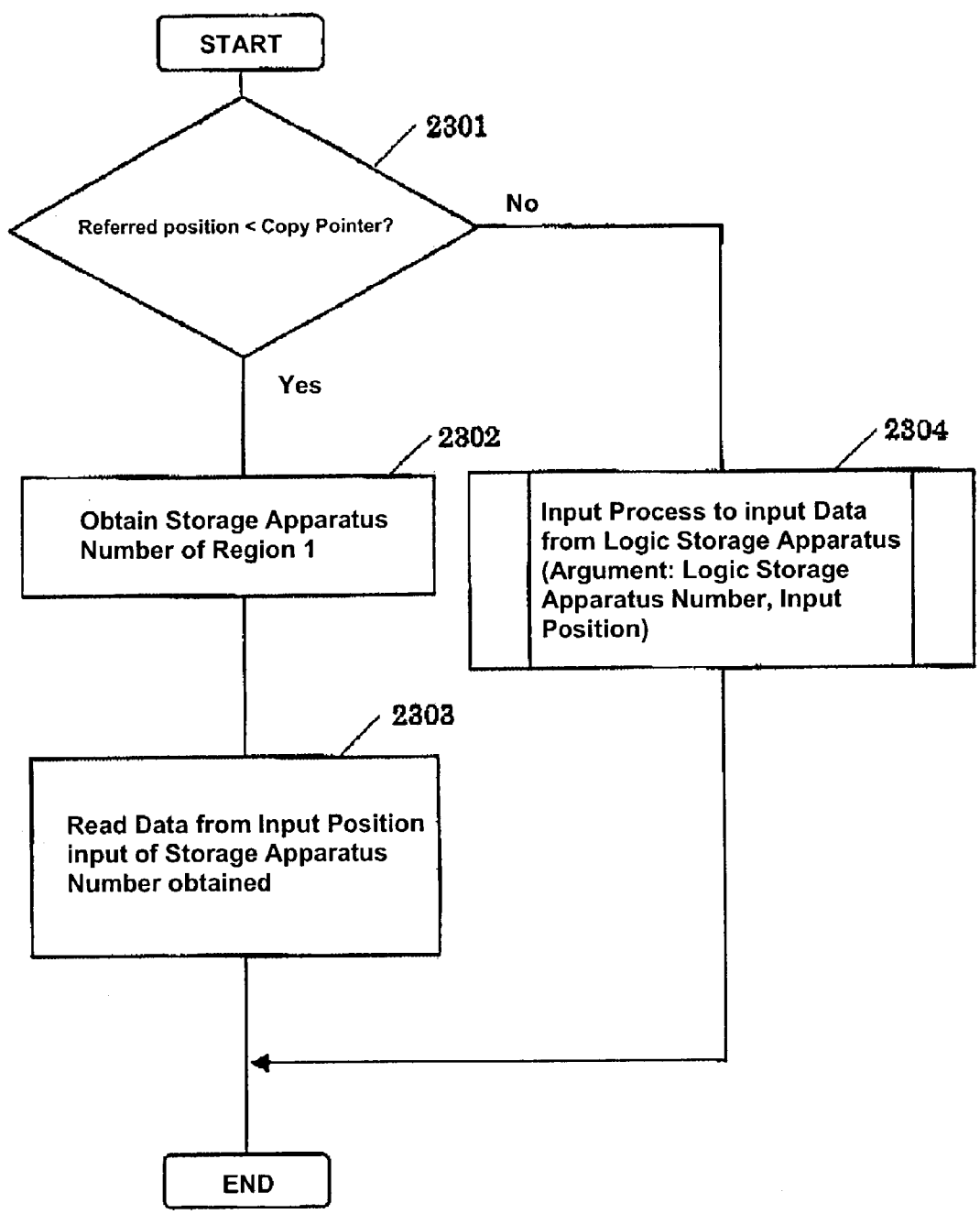
FIG. 23 shows a flowchart of a third read command process.

FIG. 23 shows a flowchart of the read command process 3. In Step 2301, a comparison is made between the reference position and the copy pointer 1006. If the reference position has a value smaller than the value of the pair pointer 1006, the process proceeds to Step 2302. If the reference position has a value that is the same as or larger than that of the pair pointer 1006, the process proceeds to Step 2304. Proceeding to Step 2302 means that the reference position is a position where the region 2 of the original logic storage apparatus has not been switched with the region 2 of the auxiliary logic storage apparatus in the pair-deleting state 805. In Step 2302, the storage apparatus number of the region 1 of the original logic storage apparatus is acquired. In Step 2303, data is read from the input position that has been input for the storage apparatus number obtained. That is, the data is read from the storage apparatus to which the region 1 of the original logic storage apparatus belongs. Proceeding from Step 2301 to Step 2304 means that the reference position is a position where the replacement of the respective regions 2 of the original logic storage apparatus and the auxiliary logic storage apparatus has been completed in the pair-deleing state 805. In Step 2304, the input process is performed from the logic storage apparatus. At this juncture, a logic storage apparatus number and the input are delivered to an input routine from the logic storage apparatus.

The read command process 3 is realized by the processed indicated through FIGS. 21 and 23.

Figure 24:
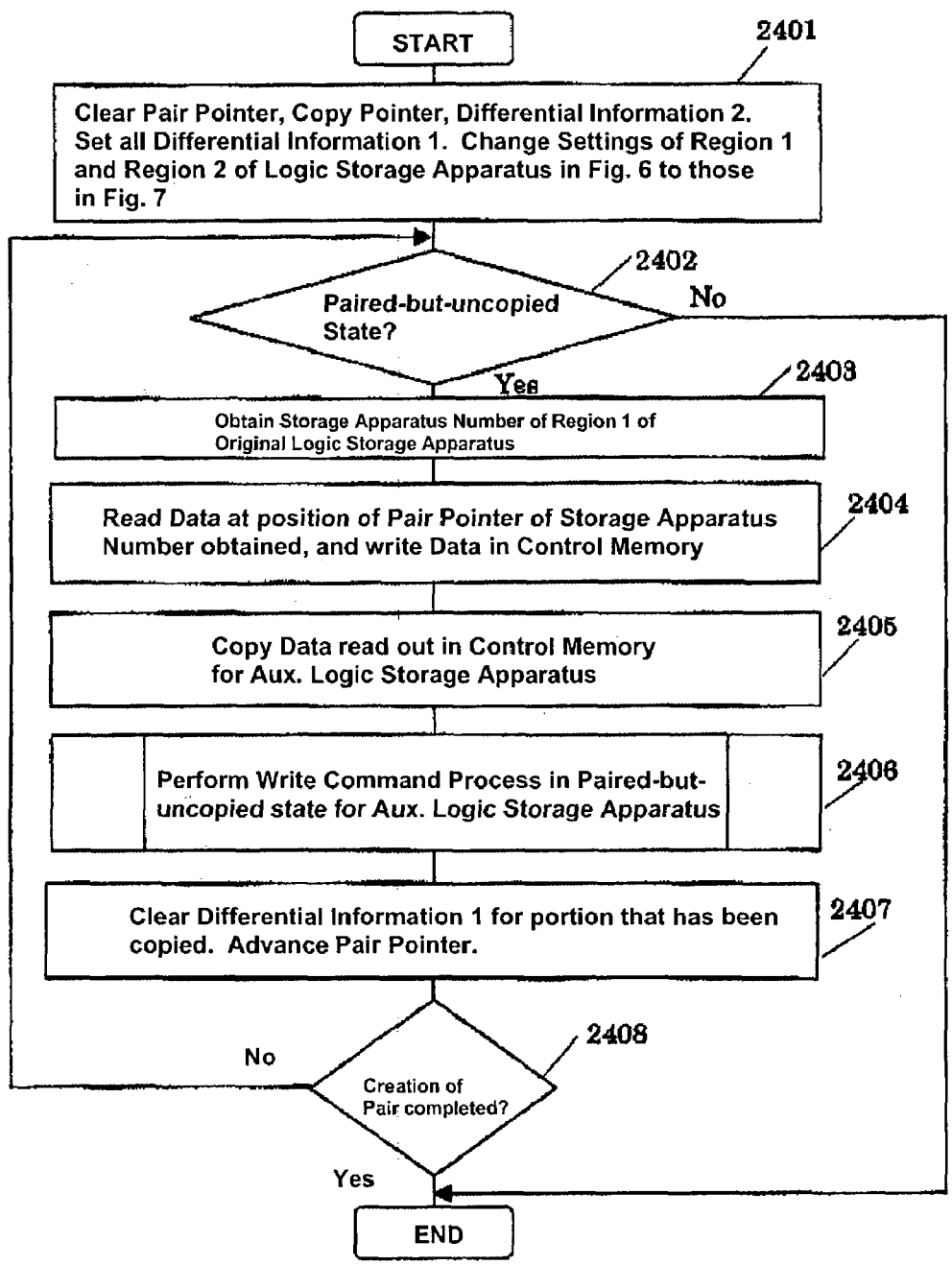
FIG. 24 shows a flowchart of a pair create command process.

Next, FIG. 24 shows a flowchart of the pair create command process. In Step 2401, the pair pointer 1007 and the copy pointer 1006 are initialized, and bits of the differential information 1 901 for the pair are all turned on. Also, bits of the differential information 2 902 for the pair are all turned off. Moreover, the settings for the region 1 and region 2 of the logic storage apparatus are altered from the pre-pair creating state in FIG. 6 to the state shown in FIG. 7 after the pair creation command is received. The pair status is referred to in Step 2402. The pair creating process is terminated if it is not the paired-but-uncopied state 802. It is necessary to examine the pair status repeatedly, because, if a pair deletion request is made against the paired-but-uncopied state 802, the status will shift to the pair-deleting state 805. If the status is the paired-but-uncopied state 802 in Step 2402, the process proceeds to Step 2403. In Step 2403, the storage apparatus number for the region 1 of the original storage apparatus is acquired. After reading the data at the position of the storage apparatus number indicated by the pair pointer 1007, the data is written in the memory 103 in Step 2404. The data that has been read out is next copied within the memory 103 in Step 2405. In Step 2406, an auxiliary logic storage apparatus number is given to a write command process routine in the paired-but-uncopied state, and the copied data is output to the auxiliary logic storage apparatus. In the write command process in the paired-but-uncopied state, the processes proceed through Steps 1501, 1502 to 1503. Up to this point, the position data indicated by the copy pointer 1006 coincides with those between the original logic storage apparatus and the auxiliary logic storage apparatus. In Step 2407, bits of the differential information 1 for the copied portion are turned off. Also, the pair pointer 1007 is advanced by the portion copied. As the value of the pair pointer 1007 is determined by the volume of the logic storage apparatus, a determination is made based on the value of the pair pointer 1007 in Step 2408 as to whether a pair creation is completed. If the pair creation is not completed, the process returns to Step 2402. If the pair creating has been completed, the pair creating process terminates.

The pair create command process is realized by the processed indicated through FIGS. 15 and 24.

FIG. 25 shows a table 1001 formed when the process of creating pairs is completed. The pair status 1003 indicates the paired-but-uncopied state 802, the copy pointer 1006 is zero, and the pair pointer 1007 indicates a value indicating the terminating end of the logic storage apparatus 1 301 of the original logic storage apparatus.

Figure 26:
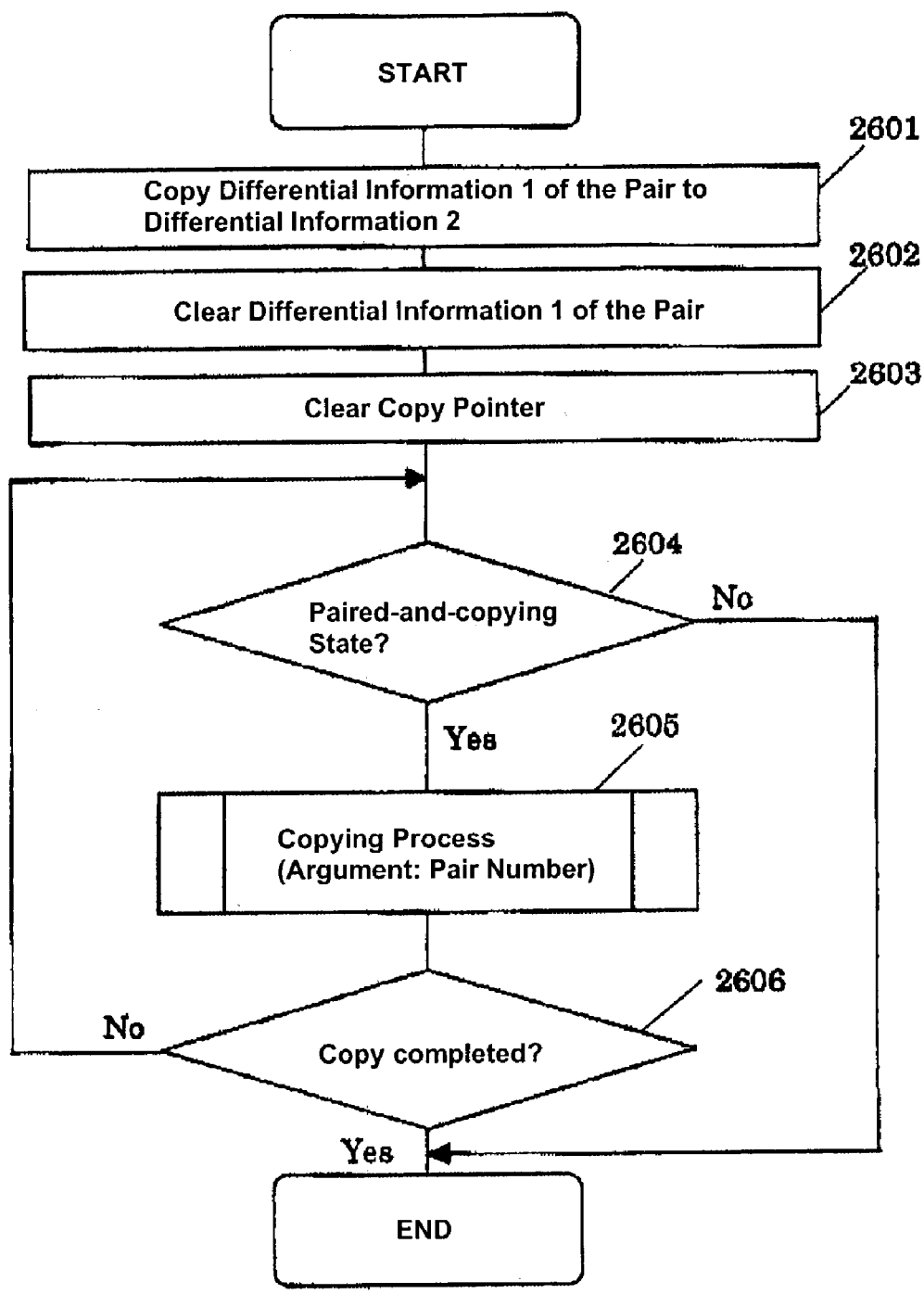
FIG. 26 shows a flowchart of a copy create command process.

FIG. 26 shows a flowchart of a copy create command process. In Step 2601, the differential information 1 901 of the pair is copied to the differential information 2 902. In the copying process, the portion of the differential information 2 902 where bits are on is copied from the original logic storage apparatus to the auxiliary logic storage apparatus. In Step 2602, the differential information 1 901 of the pair is cleared. When a data renewal to the original logic storage apparatus newly occurs during the copying process, bits in the differential information 1 901 that corresponds to the renewed portion are turned on, which will be used when the differential information pair is re-synchronized. The copy pointer 1006 is cleared in Step 2603. In Step 2604, a determination is made as to whether or not the pair status is in the paired-and-copying state 803. If the status is not the paired-and-copying state 803, the copy create command process terminates. If the status is in the paired-and-copying state, the process proceeds to Step 2605 to perform the copying process. When the process returns from the copying process in Step 2605, the copy pointer 1006 has advanced proportionately to the amount in which copying has been completed. As the value of the copy pointer 1006 is determined by the volume of the logic storage apparatus, a determination as to whether the copying process has been completed can be made based on the value of the copy pointer 1006. If the copying process is not completed, the process returns to Step 2604. If the pair creation has been completed, the process terminates.

Figure 27:
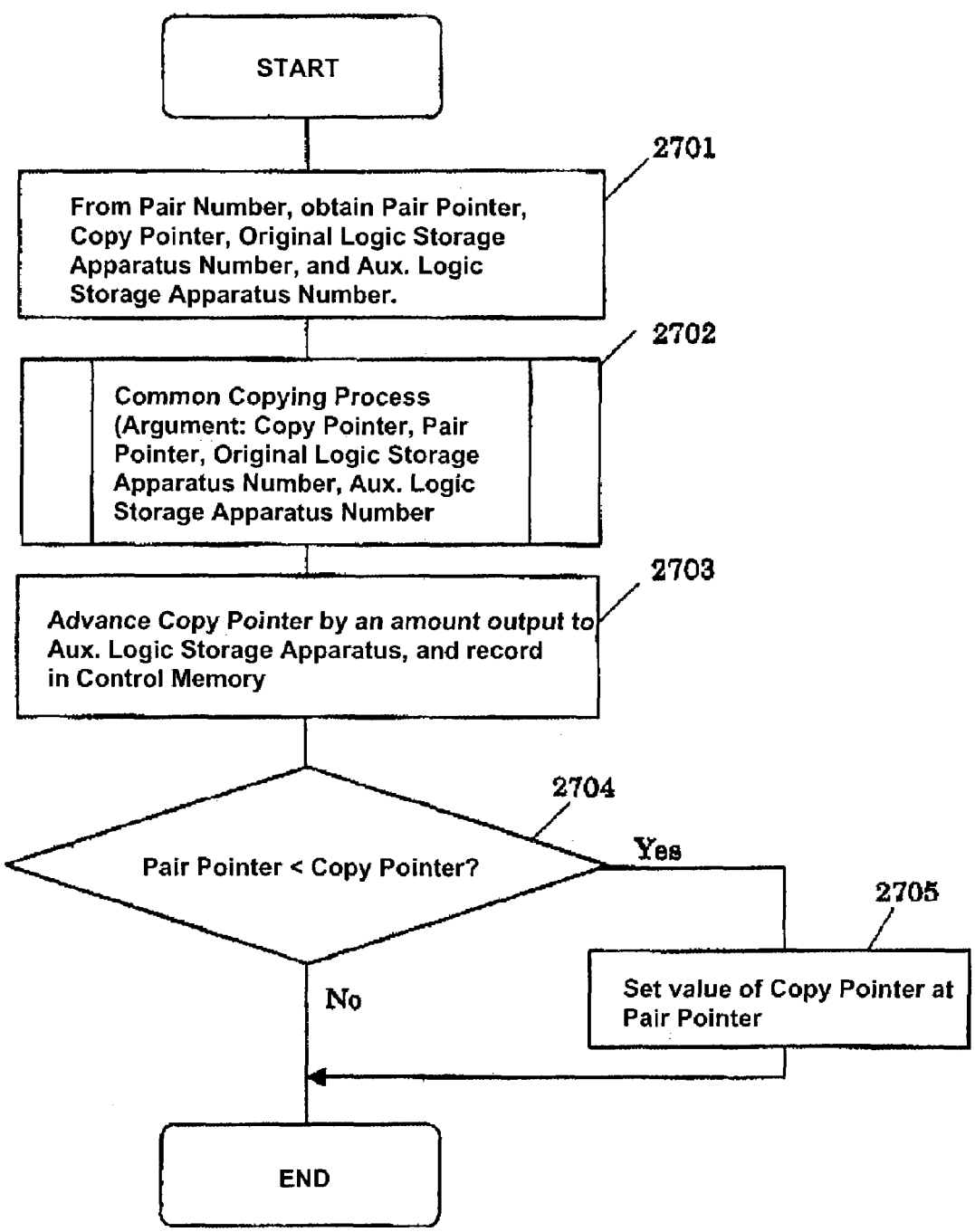
FIG. 27 shows a flowchart of a copy process.

FIG. 27 shows a flowchart of the copying process. In Step 2701, the pair pointer 1007, copy pointer 1006, original logic storage apparatus number, auxiliary logic storage apparatus number are acquired from the pair number that has been input. In Step 2702, the common copying process is performed. At this point, the copy pointer 1006, original logic storage apparatus number, and auxiliary logic storage apparatus number are delivered to a common copying process routine. In Step 2703, the copy pointer 1006 is advanced by the amount for a portion copied under the common copying process. In Step 2704, the pair pointer 1007 and the copy pointer 1006 are compared. If the value of the pair pointer 1007 is equal to or larger than that of the copy pointer 1006, the copying process ends. If the value of the pair pointer 1007 is smaller than that of the copy pointer 1006, the copying process is terminated after the value of the copy pointer 1006 is set in the copy pointer 1006. Steps 2704 and 2705 are provided so as to handle a situation in which a copy create request is received before the pair creation is completed in the paired-but-uncopied state 802.

As described above, FIG. 28 shows a flowchart of the common copying process.

The copy create command process is realized by the processes indicated through FIGS. 20, 21, 26, 27 and 28.

FIG. 29 shows a table 1001 formed when the copying process is completed. The pair status 1003 indicates a paired-and-copied state 804 where a pair exists as well as a copy, and the copy pointer 1006 and the pair pointer 1007 show values that indicate the terminating end of the logic storage apparatus 1 301 of the original logic storage apparatus.

FIG. 30 shows a table 1001 formed when a pair delete command is received against the paired-and-copied state 804 where a pair exists as well as a copy. The pair status 1003 of the table 1001 indicates the pair-deleting state 805. The copy pointer 1006 is zero, and the pair pointer 1007 shows a value that indicates the terminating end of the logic storage apparatus 1 301 of the original logic storage apparatus.

Figure 31:
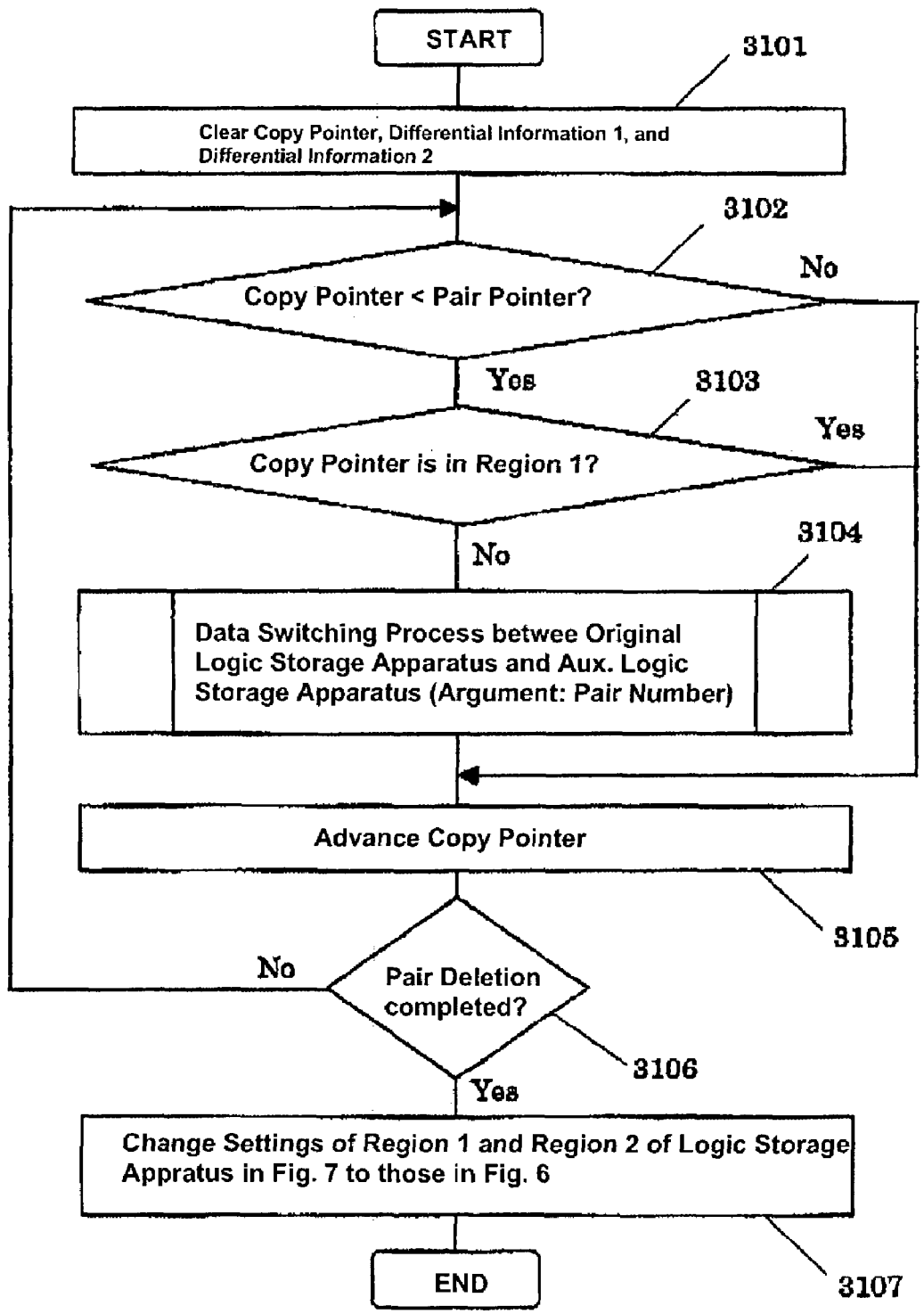
FIG. 31 shows a flowchart of a pair erase command process.

FIG. 31 shows a flowchart of the pair delete command process. In Step 3101, the copy pointer 1006, the differential information 1 901 for the pair and the differential information 2 902 for the pair are cleared. In Step 3102, the copy pointer 1006 and the pair pointer 1007 are compared. If the value of the copy pointer 1006 is smaller than that of the pair pointer 1007, the process proceeds to Step 3103. If the value of the copy pointer 1006 is equal to or larger than that of the pair pointer 1007, the process advances to Step 3105. Data having position data higher than the pair pointer 1007 are still in the same storage apparatus as it is before the pair is formed because the pair creation process has not been completed. Because of this, the process moves to Step 3105 because there is no need to switch the data between the original logic storage apparatus and the auxiliary logic storage apparatus. In Step 3103, it is examined whether the copy pointer 1006 corresponds to the region 1. If it is not, the process proceeds to Step 3104. If it corresponds to the region 1, the process moves to Step 3105. The positions of the data in the region 1 do not change as they are before and after the pair is created. Because of this, the process proceeds to Step 3105 as there is no need to switch the data between the original logic storage apparatus and the auxiliary logic storage apparatus. In Step 3104, a data switching process is performed between the original logic storage apparatus and the auxiliary logic storage apparatus. At this juncture, the pair number is delivered to a data switching process routine. In Step 3105, the copy pointer is advanced only by the amount for a portion which has been switched in Step 3104. The value of the copy pointer 1006 is determined by the volume of the logic storage apparatus. Therefore, in Step 3106, the value of the copy pointer 1006 is used to determine whether or not the pair deletion process has been completed. If the pair deletion process has not been completed, the process returns to Step 3102. If completed, the pair deletion command process is terminated after the settings for the region 1 and region 2 of the logic storage apparatus are altered from the state in FIG. 7 indicating a state after the pair create command is received to the state in FIG. 6 indicating a state before the pair is created.

Figure 32:
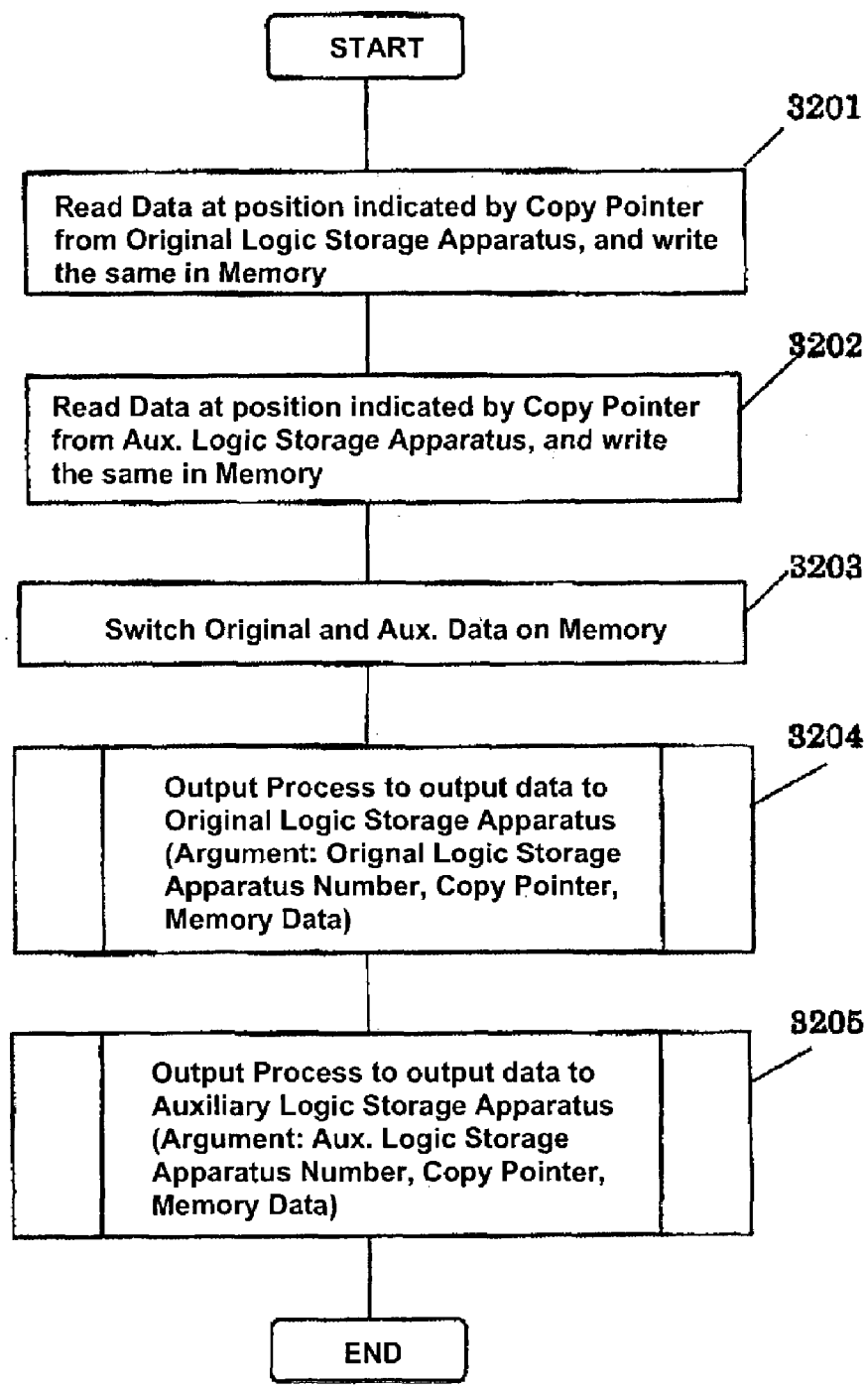
FIG. 32 shows a flowchart of a data switch command process.

FIG. 32 shows the data switching process. In Step 3201, data on the original logic storage apparatus indicated by the copy pointer is read out and then written into the memory 103. In Step 3202, data on the auxiliary logic storage apparatus indicated by the copy pointer is read out and written into the memory 103. In Step 3203, the data read from the original logic apparatuses and the auxiliary logic apparatuses are switched on the memory. An output process to output data to the logic storage apparatuses is performed in Steps 3204 and 3205. At this juncture, the original logic storage apparatus number, the copy pointer 1006 and the data read from the auxiliary logic storage apparatus on the memory 103 are delivered to an output process routine of the logic storage apparatus in Step 3204. Also, the auxiliary logic storage apparatus number, the copy pointer 1006 and the data read from the original logic storage apparatus on the memory 103 are delivered to an output process routine of the logic storage apparatus in Step 3205. The data switching process is terminated when Step 3205 ends.

The pair delete command process can be realized through the processed indicated in FIGS. 14, 31 and 32.

Figure 33:
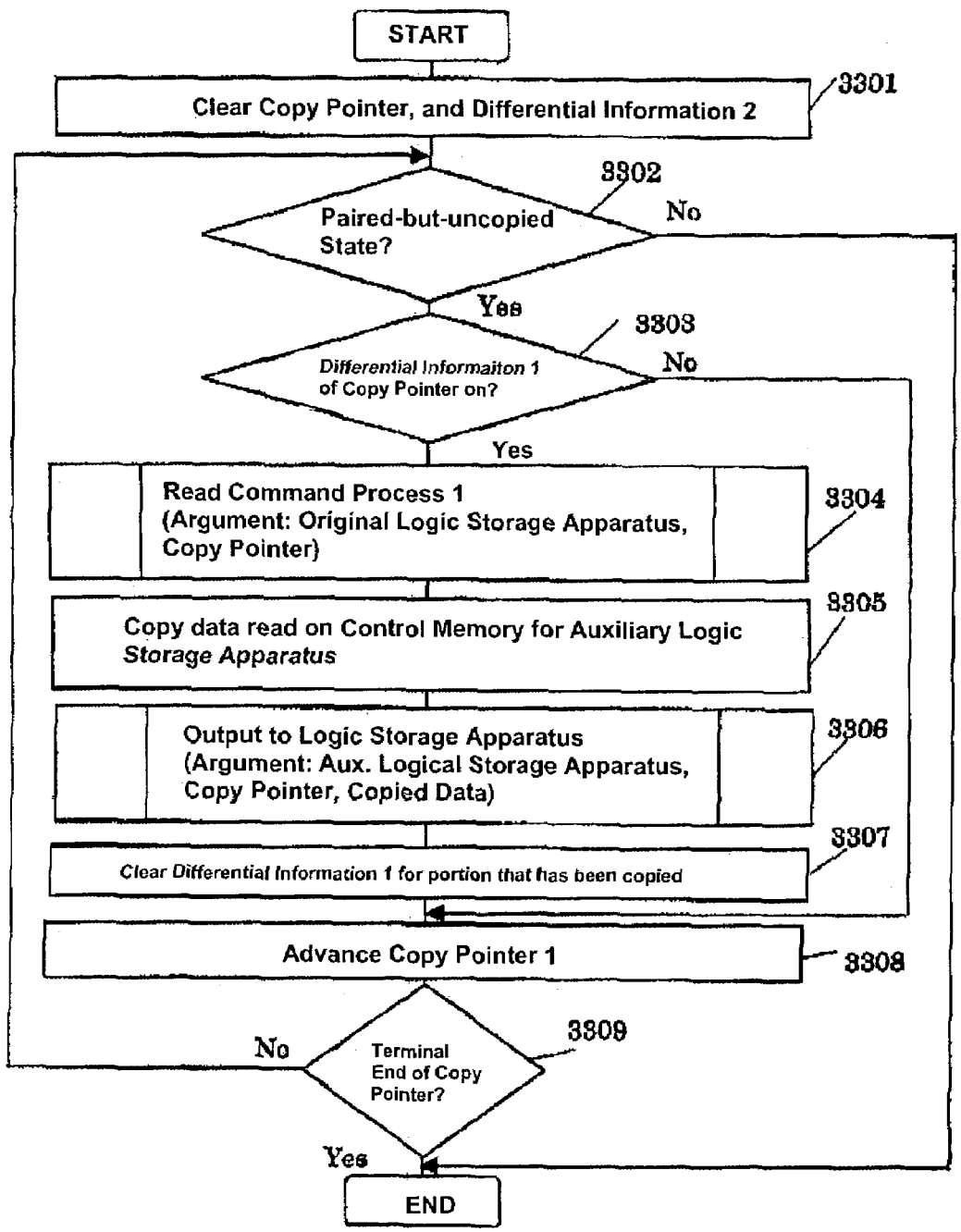
FIG. 33 shows a flowchart of a data resynchronize command process.

FIG. 33 shows a flowchart of the pair resynchronize command process. In Step 3301, the copy pointer 1006 and the differential information 2 902 for the pair are cleared. The pair status is examined in Step 3302, and the pair resynchronize command process ends if the pair status is not the paired-but-uncopied state 802. This step is included so that the process can make, even during the synchronizing process, a transition to the paired-and-copying state 803 if there is a copy create request, or to the pair-deleting state 805 if a pair delete request is made. In Step 3302, the process proceeds to Step 3303 if the pair status is the paired-but-uncopied state 802. In Step 3303, whether bits of the differential information 1 901 indicated by the copy pointer are on is checked. If the bits are off, the process proceeds to Step 3308 because the data in the original and auxiliary apparatus at the values indicated by the copy pointer 1006 coincide with one another. If the bits are on, the process proceeds to Step 3304 to make the data coincide with one another. In Step 3304, the read command process 1 is performed. At this juncture, the original logic storage apparatus number and the copy pointer 1006 are delivered to a read command process 1 routine. The data thus read are copied in Step 3305 on the memory 103 for the auxiliary logic storage apparatus. In Step 3306, the output process is performed to output data to the logic storage apparatus. At this time, the auxiliary logic storage apparatus number, and the data copied in Step 3305 are delivered to an output process routine of the logic storage apparatus. In Step 3307, the bits of the differential information 1 901 for the copied portion are turned off. In Step 3308, the copy pointer 1006 is advanced by the amount for a portion where the copy has been completed. In Step 3309, a determination is made based on the value of the copy pointer 1006 as to whether the pair resynchronize command process has been completed. If the copy pointer 1006 does not indicate the terminated end of the logic storage apparatus, the process returns to Step 3302. If the copy printer 1006 indicates the terminated end of the logic storage apparatus, the pair re-synchronizing command process is terminated.

In accordance with an embodiment of the present invention, the above described processes may be implemented in a program that renders the storage control apparatus to perform the processes described above.

Furthermore, a disk sub system in accordance with an embodiment of the present invention may be equipped with a first storage apparatus including a first logic storage apparatus divided into a first region and a second region and a second storage apparatus including a second logic storage apparatus divided into a first region and a second region. The first logic storage apparatus and the second logic storage apparatus connect to a host apparatus, wherein data on the first logic storage apparatus is copied to the second logic storage apparatus by an instruction from the host apparatus. The disk sub system includes operational sections (not shown) that designate the second logic storage apparatus as a copy destination for copying data of the first logic storage apparatus based on a first command to designate a copy source and a copy destination, switches the second region of the first logic storage apparatus and the second region of the second logic storage apparatus with one another, and copy data stored in the first storage apparatus to the second storage apparatus based on a second command to designate to create a copy of data, respectively.

One of a write command process and a read command process is performed for the logic storage apparatus under a copying process, and the above-described disk sub system may further comprises operational sections (not shown) that determine as to whether a position subject to one of the write command process and the read command process is a position in the logic storage apparatus at which switching of the second region of the first logic storage apparatus and the second region of the logic storage apparatus has been completed; performs, when the switching has not been completed, one of the write command process and the read command process for the storage apparatus to which the first region of the first logic storage apparatus belongs; and performs, when the switching has been completed, one of the write command process and the read command process for the first logic storage apparatus.

The data copy system described above may further comprises operational sections (not shown) that receives a third command from the host apparatus for releasing the designation of the copy source and the copy destination; makes a determination if a position where switching between the second region of the first logic storage apparatus and the second region of the second logic storage apparatus is completed is located after a position where copying is completed, and if the position where copying is completed is not in the first region; and switches data of the first logic storage apparatus and data of the second logic storage apparatus with one another when the determination is positive.

In accordance with the present invention, by dynamically changing the configuration of logic storage apparatuses at data copying source and data copying destination through forming a pair for making copies, the processing capability of the logic storage apparatus at the data copying source can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A data copy method for a disk sub system that is equipped with a first storage apparatus including a first logic storage apparatus divided into a first region and a second region and a second storage apparatus including a second logic storage apparatus divided into a first region and a second region, the first logic storage apparatus and the second logic storage apparatus connecting to a host apparatus, wherein data on the first logic storage apparatus is copied to the second logic storage apparatus by an instruction from the host apparatus, the data copy method comprising the steps of:

designating the second logic storage apparatus as a copy destination for copying data of the first logic storage apparatus based on a first command to designate a copy source and a copy destination;

switching the second region of the first logic storage apparatus and the second region of the second logic storage apparatus with one another;

such that the first logic storage apparatus comprises the first region of the first storage apparatus and second region of the second storage apparatus, and the second logic storage apparatus comprises the first region of the second storage apparatus and the second region of the first storage apparatus; and copying data stored in the first storage apparatus to the second storage apparatus based on a second command to designate to create a copy of data;

receiving a third command from the host apparatus for releasing the designation of the copy source and the copy destination;

making a determination of:

(1) if a position where switching between the second region of the first logic storage apparatus and the second region of the second logic storage apparatus is completed is located after a position where copying is completed, and (2) if the position where copying is completed is not in the first region;

switching data of the first logic storage apparatus and data of the second logic storage apparatus with one another when the determinations of (1) and (2) are both positive.

2. A tangible computer-readable medium comprising a data copy program for a disk sub system that is equipped with a first storage apparatus including a first logic storage apparatus divided into a first region and a second region and a second storage apparatus including a second logic storage apparatus divided into a first region and a second region, the first logic storage apparatus and the second logic storage apparatus connecting to a host apparatus, wherein data on the first logic storage apparatus is copied to the second logic storage apparatus by an instruction from the host apparatus, wherein when executed by a computer, the data copy program renders the disk sub system to perform the steps of:

designating the second logic storage apparatus as a copy destination for copying data of the first logic storage apparatus based on a first command to designate a copy source and a copy destination;

switching the second region of the first logic storage apparatus and the second region of the second logic storage apparatus with one another;

such that the first logic storage apparatus comprises the first region of the first storage apparatus and second region of the second storage apparatus, and the second logic storage apparatus comprises the first region of the second storage apparatus and the second region of the first storage apparatus; and copying data stored in the first storage apparatus to the second storage apparatus based on a second command to designate to create a copy of data, wherein the host continues to access the copy data during the above steps;

receiving a third command from the host apparatus for releasing the designation of the copy source and the copy destination;

making a determination of:

(1) if a position where switching between the second region of the first logic storage apparatus and the second region of the second logic storage apparatus is completed is located after a position where copying is completed, and (2) if the position where copying is completed is not in the first region;

switching data of the first logic storage apparatus and data of the second logic storage apparatus with one another when the determinations of (1) and (2) are both positive.

3. A disk sub system that is equipped with a first storage apparatus including a first logic storage apparatus divided into a first region and a second region and a second storage apparatus including a second logic storage apparatus divided into a first region and a second region, the first logic storage apparatus and the second logic storage apparatus connecting to a host apparatus, wherein data on the first logic storage apparatus is copied to the second logic storage apparatus by an instruction from the host apparatus, wherein the disk sub system comprises:

a section that designates the second logic storage apparatus as a copy destination for copying data of the first logic storage apparatus based on a first command to designate a copy source and a copy destination;

a section that switches the second region of the first logic storage apparatus and the second region of the second logic storage apparatus with one another;

such that the first logic storage apparatus comprises the first region of the first storage apparatus and second region of the second storage apparatus, and the second logic storage apparatus comprises the first region of the second storage apparatus and the second region of the first storage apparatus;

a section that copies data stored in the first storage apparatus to the second storage apparatus based on a second command to designate to create a copy of data;

a section that receives a third command from the host apparatus for releasing the designation of the copy source and the copy destination;

a section that makes a determination of:

(1) if a position where switching between the second region of the first logic storage apparatus and the second region of the second logic storage apparatus is completed is located after a position where copying is completed, and (2) if the position where copying is completed is not in the first region;

a section that switches data of the first logic storage apparatus and data of the second logic storage apparatus with one another when the determinations of (1) and (2) are both positive.

* * * * *